(12) United States Patent
Matsumura et al.

(10) Patent No.: US 12,543,195 B2
(45) Date of Patent: Feb. 3, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 319 days.

(21) Appl. No.: 18/261,378

(22) PCT Filed: Jan. 15, 2021

(86) PCT No.: PCT/JP2021/001309
§ 371 (c)(1),
(2) Date: Jul. 13, 2023

(87) PCT Pub. No.: WO2022/153493
PCT Pub. Date: Jul. 21, 2022

(65) Prior Publication Data
US 2024/0064768 A1    Feb. 22, 2024

(51) Int. Cl.
*H04W 72/232*    (2023.01)
*H04L 1/00*    (2006.01)
*H04L 1/1829*    (2023.01)

(52) U.S. Cl.
CPC ......... *H04W 72/232* (2023.01); *H04L 1/0061* (2013.01); *H04L 1/1861* (2013.01)

(58) Field of Classification Search
CPC .. H04W 72/232; H04L 1/0061; H04L 1/1861; H04L 1/1822
See application file for complete search history.

(56) References Cited

U.S. PATENT DOCUMENTS

2020/0344012 A1* 10/2020 Karaki ................. H04L 1/1812

OTHER PUBLICATIONS

Office Action issued in Japanese Patent Application No. 2022-574998, mailed on Feb. 4, 2025 (8 pages).
NTT Docomo, Inc.; "Discussion on multi-beam operation"; 3GPP TSG RAN WG1 #103-e, R1-2009174; e-Meeting; Oct. 26-Nov. 13, 2020 (23 pages).
Nokia, Nokia Shanghai Bell; "Enhancements on Multi-beam Operation"; 3GPP TSG RAN WG1 #103-e, R1-2008903; e-Meeting; Oct. 23-Nov. 13, 2020 (27 pages).

(Continued)

*Primary Examiner* — Mohammad S Anwar
(74) *Attorney, Agent, or Firm* — Osha Bergman Watanabe & Burton LLP

(57) ABSTRACT

A terminal according to an aspect of the present disclosure includes a receiving section that receives information indicating a plurality of transmission configuration indication (TCI) states, and receives downlink control information indicating one or more TCI states of the plurality of TCI states and not indicating scheduling of any of a physical downlink shared channel and a physical uplink shared channel, and a control section that applies the one or more TCI states to a plurality of kinds of signals. According to an aspect of the present disclosure, the TCI state indication can be appropriately performed.

6 Claims, 18 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2010 (149 pages).
Futurewei; "Enhancement on multi-beam operation"; 3GPP TSG RAN WG1 Meeting #103-e, R1-2007546; e- Meeting, Oct. 26-Nov. 13, 2020 (9 pages).
ETRI; "Potential PDCCH enhancements for NR URLLC;" 3GPP TSG RAN WG1 Ad-Hoc Meeting 1901, R1-1900686; Taipei, Taiwan; Jan. 21-25, 2019 (6 pages).
International Search Report issued in PCT/JP2021/001309 on Aug. 17, 2021 (3 pages).
Written Opinion of the International Searching Authority issued in PCT/JP2021/001309 on Aug. 17, 2021 (3 pages).

\* cited by examiner

FIG. 3A

|  | DCI format 0_0/0_1/0_2 | DCI format 1_0/1_1/1_2 |
|---|---|---|
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with $\mu = 1$<br><br>set to all '1's, otherwise | set to all '0's for FDRA Type 0 or for *dynamicSwitch*<br><br>set to all '1's for FDRA Type 1 |

FIG. 3B

|  | DCI format 0_0/0_1/0_2 | DCI format 1_0/1_1/1_2 |
|---|---|---|
| Redundancy version | set to all '0's | set to all '0's |
| Modulation and coding scheme | set to all '1's | set to all '1's |
| Frequency domain resource assignment | set to all '0's for FDRA Type 2 with $\mu = 1$<br><br>set to all '1's, otherwise | set to all '0's for FDRA Type 0 or for *dynamicSwitch*<br><br>set to all '1's for FDRA Type 1 |

| | Common beam indication for both of UL and DL | DL only beam indication for separate beam indication | UL only beam indication for separate beam indication |
|---|---|---|---|
| DCI field / format | TCI state of DCI format 1_1/1_2, and/or new DCI format | TCI state of DCI format 1_1/1_2 | Alt.1-1<br>Alt.1-2<br>Alt.1-3 |
| Acknowledgement to the beam indication | ACK/NACK of the PDSCH scheduled by the DCI | ACK/NACK of the PDSCH scheduled by the DCI | Alt.2-1<br>Alt.2-2<br>Alt.2-3 |

FIG. 6

|  | Common beam indication for both of UL and DL | DL only beam indication for separate beam indication | UL only beam indication for separate beam indication |
|---|---|---|---|
| DCI field / format | TCI state of DCI format 1_1/1_2, and/or new DCI format | TCI state of DCI format 1_1/1_2 | Alt.1-1<br>Alt.1-2<br>Alt.1-3 |
| Acknowledgement to the beam indication | ACK/NACK of the PDSCH scheduled by the DCI, and/or HARQ mechanism (SPS PDSCH release) to the new DCI format | ACK/NACK of the PDSCH scheduled by the DCI, and/or HARQ mechanism (SPS PDSCH release) to the new DCI format | Alt.2-1<br>Alt.2-2<br>Alt.2-3 |

FIG. 7

| | Common beam indication for both of UL and DL | DL only beam indication for separate beam indication | UL only beam indication for separate beam indication |
|---|---|---|---|
| DCI field / format | with PDSCH scheduling: TCI state of DCI format 1_1/1_2<br><br>without PDSCH scheduling: new DCI format without PDSCH scheduling | with PDSCH scheduling: TCI state of DCI format 1_1/1_2<br><br>without PDSCH scheduling: new DCI format without PDSCH scheduling | Alt.1-1<br>Alt.1-2<br>Alt.1-3 |
| Acknowledgement to the beam indication | with PDSCH scheduling: HARQ-ACK to the PDSCH scheduled by the DCI<br><br>without PDSCH scheduling: acknowledgement mechanism directly response to beam indication DCI (e.g. analogous to SPS PDSCH release) | with PDSCH scheduling: HARQ-ACK to the PDSCH scheduled by the DCI<br><br>without PDSCH scheduling: acknowledgement mechanism directly response to beam indication DCI (e.g. analogous to SPS PDSCH release) | Alt.2-1<br>Alt.2-2<br>Alt.2-3 |

FIG. 8

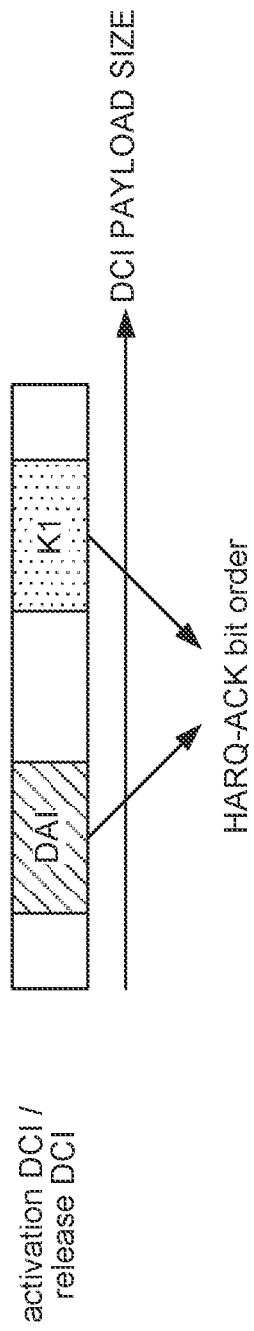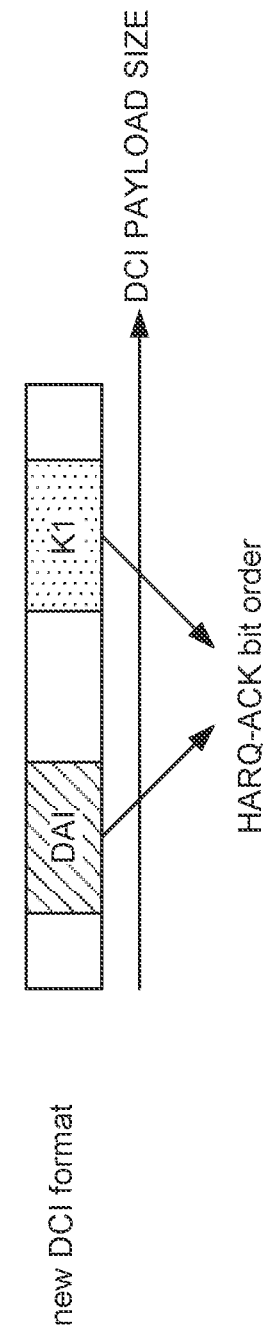
FIG. 13A
FIG. 13B

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication system (for example, NR), it is studied that a user terminal (terminal, User Equipment (UE)) controls transmission/reception processing on the basis of information related to Quasi-Co-Location (QCL) (QCL assumption/Transmission Configuration Indication (TCI) state/spatial relation).

A study is underway to apply a configured/activated/indicated TCI state to a plurality of kinds of signals (channel/RS). However, a method for indicating a TCI state is not clear in some cases. If the method for indicating a TCI state is not clear, communication quality reduction, throughput reduction, or the like may be involved.

In view of above, an object of the present disclosure is to provide a terminal, a radio communication method, and a base station capable of appropriately performing a TCI state indication.

Solution to Problem

A terminal according to an aspect of the present disclosure includes a receiving section that receives information indicating a plurality of transmission configuration indication (TCI) states, and receives downlink control information indicating one or more TCI states of the plurality of TCI states and not indicating scheduling of any of a physical downlink shared channel and a physical uplink shared channel, and a control section that applies the one or more TCI states to a plurality of kinds of signals.

Advantageous Effects of Invention

According to an aspect of the present disclosure, the TCI state indication can be appropriately performed.

BRIEF DESCRIPTION OF DRAWINGS

FIGS. 3A and 3B are diagrams to show examples of a special value for validation of activation/release for a SPS PDSCH and a UL configured grant type 2.

FIG. 6 is a diagram to show an example of a beam indication method according to a first embodiment.

FIG. 7 is a diagram to show an example of a beam indication method according to a second embodiment.

FIG. 8 is a diagram to show an example of a beam indication method according to a variation of the second embodiment.

FIGS. 13A and 13B are diagrams to show examples of an HARQ-ACK bit order determination method according to a fifth embodiment.

Figure 1A:
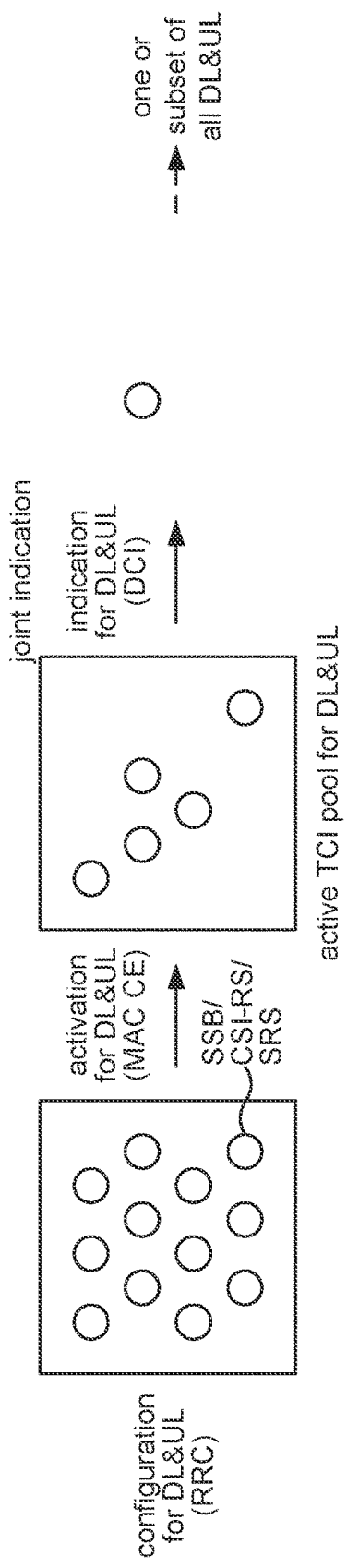
FIGS. 1A and 1B are diagrams to show examples of a common beam.

DESCRIPTION OF EMBODIMENTS (TCI, Spatial Relation, QCL)

For NR, a study is underway to control reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE on the basis of a transmission configuration indication state (TCI state).

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a control resource set (CORESET), channel, or reference signal has a specific QCL (for example, QCL type D) relation with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or the spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relation with the channel may be, for example, at least one of a synchronization signal block (SSB), a channel state information reference signal (CSI-RS), a reference signal for measurement (sounding reference signal (SRS)), a tracking CSI-RS (also referred to as a tracking reference signal (TRS)), and a QCL detection reference signal (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

A QCL type X RS in a TCI state may mean a RS having a QCL type X relation with (a DMRS of) a channel/signal, and the RS may be referred to as a QCL source for the QCL type X in the TCI state.

(Pathloss RS)

A pathloss $PL_{b,f,c}(q_d)$ [dB] in transmission power control for each of a PUSCH, a PUCCH, and an SRS is calculated by the UE using an index $q_d$ of a reference signal (RS, pathloss reference RS (PathlossReferenceRS)) for downlink BWP associated with an active UL BWP b of a carrier f of a serving cell c. In the present disclosure, a pathloss RS, a pathloss (PL)-RS, an index $q_d$, an RS used for pathloss calculation, and an RS resource used for pathloss calculation may be interchangeably interpreted. In the present disclosure, calculation, estimation, measurement, and tracking may be interchangeably interpreted.

A study is underway whether to change an existing mechanism of a higher layer filtered RSRP for the pathloss measurement in a case that the pathloss RS is updated by the MAC CE.

In the case that the pathloss RS is updated by the MAC CE, pathloss measurement on the basis of an L1-RSRP may be applied. The higher layer filtered RSRP may be used for the pathloss measurement at an available timing after the MAC CE for update of the pathloss RS, and the L1-RSRP may be used for the pathloss measurement before the higher layer filtered RSRP is applied. The higher layer filtered RSRP may be used for the pathloss measurement at an available timing after the MAC CE for update of the pathloss RS, and a higher layer filtered RSRP for a pathloss RS before that may be used before the timing. Similar to the operation in Rel. 15, the higher layer filtered RSRP may be used for the pathloss measurement, and the UE may track all pathloss RS candidates configured by the RRC. The maximum number of pathloss RSs configurable by the RRC may depend on UE capability. In a case that the maximum number of pathloss RSs configurable by the RRC is X, not more than X pathloss RS candidates may be configured by the RRC, and a pathloss RS may be selected by the MAC CE from among the configured pathloss RS candidates. The maximum number of pathloss RSs configurable by the RRC may be 4, 8, 16, 64, or the like.

In the present disclosure, a higher layer filtered RSRP, and a filtered RSRP, layer 3 filtered RSRP may be interchangeably interpreted.

(Default TCI State/Default Spatial Relation/Default PL-RS)

In a RRC connection mode, in both a case that the TCI information in the DCI (higher layer parameter "TCI-PresentInDCI") is set as "enabled" and a case that the TCI information in the DCI is not configured, in a case that a time offset between reception of the DL DCI (the DCI scheduling the PDSCH) and the corresponding PDSCH (the PDSCH scheduled by the DCI) is less than a threshold (timeDurationForQCL) (application condition, first condition), in a case of non cross-carrier scheduling, the TCI state of the PDSCH (default TCI state) may be the TCI state having the lowest CORESET ID in the most recent slot in the active DL BWP of a CC thereof (of a specific UL signal). Not in the above case, the TCI state of the PDSCH (default TCI state) may be the TCI state having the lowest TCI state ID of the PDSCH in the active DL BWP of the scheduled CC.

In Rel. 15, the individual MAC CE, a PUCCH spatial relation activation/deactivation MAC CE and an SRS spatial relation activation/deactivation MAC CE, are needed. The PUSCH spatial relation conforms to the SRS spatial relation.

In Rel. 16, at least one of the PUCCH spatial relation activation/deactivation MAC CE and the SRS spatial relation activation/deactivation MAC CE may not be used.

If both the spatial relation and the PL-RS for a PUCCH are not configured in FR2 (application condition, second condition), default assumptions for the spatial relation and the PL-RS (a default spatial relation and a default PL-RS) are applied to the PUCCH. If both the spatial relation and the PL-RS for an SRS (an SRS resource for the SRS, or an SRS resource corresponding to SRI in DCI format 0_1 scheduling the PUSCH) are not configured in FR2 (application condition, second condition), default assumptions for the spatial relation and the PL-RS (a default spatial relation and a default PL-RS) are applied to the PUSCH scheduled by DCI format 0_1 and the SRS.

If a CORESET is configured in the active DL BWP on the CC (application condition), the default spatial relation and the default PL-RS may be the TCI state or QCL assumption of the CORESET having the lowest CORESET ID in the active DL BWP. If a CORESET is not configured in the active DL BWP on the CC, the default spatial relation and the default PL-RS may be an active TCI state having the lowest ID of the PDSCH in the active DL BWP.

In Rel. 15, the spatial relation of a PUSCH scheduled by DCI format 0_0 conforms to a spatial relation of a PUCCH resource having the lowest PUCCH resource ID among the PUCCH active spatial relations on the same CC. The network is required to update the PUCCH spatial relations on all SCells even in a case that a PUCCH is not transmitted on the SCells.

In Rel. 16, a PUCCH configuration for the PUSCH scheduled by DCI format 0_0 is not required. In a case that there is no active PUCCH spatial relation or no PUCCH resource for the PUSCH scheduled by DCI format 0_0 on the active UL BWP in the CC (application condition, second condition), the default spatial relation and the default PL-RS are applied to the PUSCH.

An application condition of a default spatial relation/default PL-RS for the SRS may include a default beam pathloss enabling information element for SRS (higher layer parameter "enableDefaultBeamPlForSRS") being set to be enabled. An application condition of a default spatial relation/default PL-RS for the PUCCH may include a default beam pathloss enabling information element for PUCCH (higher layer parameter "enableDefaultBeamPlForPUCCH") being set to be enabled. An application condition of the default spatial relation/default PL-RS for the PUSCH scheduled by DCI format 0_0 may include a default beam pathloss enabling information element for the PUSCH scheduled by DCI format 0_0 (higher layer parameter "enableDefaultBeamPlForPUSCH0_0") being set to be enabled.

The threshold described above may be referred to as a QCL time length (time duration), "timeDurationForQCL," "Threshold", "Threshold for offset between a DCI indicating a TCI state and a PDSCH scheduled by the DCI," "Threshold-Sched-Offset," a schedule offset threshold, a scheduling offset threshold, and the like.

(Multi-TRP)

In NR, a study is underway that one or a plurality of transmission/reception points (TRPs) (multi-TRP (MTRP)) use one or a plurality of panels (multi-panel) to perform DL transmission to the UE. A study is underway also that the UE uses one or a plurality of panels to perform UL transmission to one or the plurality of TRPs.

Note that the plurality of TRPs may correspond to the same cell identifier (cell ID), or different cell IDs. The cell ID may be a physical cell ID, or a virtual cell ID.

The multi-TRP (for example, TRP #1, TRP #2) may be connected by an ideal/non-ideal backhaul to communicate information, data, or the like. From the respective TRPs of the multi-TRP, different code words (CW) and different layers may be transmitted. A non-coherent joint transmission (NCJT) may be used as one mode of multi-TRP transmission.

In NCJT, for example, TRP #1 performs modulation mapping and layer mapping of a first codeword, and uses a first precoding a first number of layers (for example, two layers) to transmit a first PDSCH. Moreover, TRP #2 performs modulation mapping and layer mapping of a second codeword, and use a second precoding a second number of layers (for example, two layers) to transmit a second PDSCH.

Note that a plurality of PDSCHs (multi-PDSCH) subjected to NCJT may be defined to partially or fully overlap in at least one of the time and frequency domains. In other words, the first PDSCH from a first TRP and the second PDSCH from a second TRP may overlap each other in at least one of the time and frequency resources.

These first and second PDSCHs may be assumed to be not quasi-co-located (QCLed) with each other. A reception of the multi-PDSCH may be interpreted as simultaneous reception of PDSCH with not a QCL type (for example, QCL type D).

A plurality of PDSCHs (also referred to as multi-PDSCH (multiple PDSCH)) from multi-TRP may be scheduled by using one piece of DCI (single DCI, single PDCCH) (single master mode, single-DCI based multi-TRP). A plurality of PDSCHs from the multi-TRP may be scheduled by using a plurality of pieces of DCI (multi-DCI, multi-PDCCH (multiple PDCCH)) (multi-master mode, multi-DCI based multi-TRP).

A study is underway to support PDSCH (transport block (TB) or codeword (CW)) repetition across multi-TRP in URLLC with the multi-TRP. A study is underway to support repetition scheme across multi-TRP in the frequency domain or the layer (spatial) domain or the time domain (URLLC scheme, for example, scheme 1, 2a, 2b, 3, 4). In the scheme 1, the multi-PDSCH from the multi-TRP is space division multiplexed (SDM). In the schemes 2a and 2b, the PDSCH from the multi-TRP is frequency division multiplexed (FDM). In the scheme 2a, the redundancy version (RV) is the same for the multi-TRP. In the scheme 2b, the RV may be the same or different for the multi-TRP. In the schemes 3 and 4, the multi-PDSCH from the multi-TRP is time division multiplexed (TDM). In the scheme 3, the multi-PDSCH from the multi-TRP is transmitted in one slot. In the scheme 4, the multi-PDSCH from the multi-TRP is transmitted in different slots.

According to such a multi-TRP scenario, a more flexible transmission control using a good quality channel is enabled.

To support multi-PDCCH based multi-TRP transmission with intra-cell (having the same cell ID) and inter-cell (having different cell IDs), one control resource set (CORESET) in PDCCH configuration information (PDCCH-Config) may correspond to one TRP in RRC configuration information for linking multiple PDCCH and PDSCH pairs with multi-TRP.

In a case that at least one of conditions 1 and 2 below is met, the UE may determine the multi-DCI based multi-TRP. In this case, the TRP may be interpreted as a CORESET pool index.

[Condition 1]

One CORESET pool index is configured.

[Condition 2]

Two different values of CORESET pool indices (for example, 0 and 1) are configured.

In a case that the following condition is met, the UE may determine the single DCI based multi-TRP. In this case, two TRPs may be interpreted as two TCI states indicated by the MAC CE/DCI.

[Condition]

To indicate one or two TCI states for one codepoint of a TCI field in the DCI, "Enhanced TCI state Activation/Deactivation for UE-specific PDSCH MAC CE" is used.

Common beam indication DCI may be a UE-specific DCI format (for example, a DL DCI format (for example, 1_1, 1_2), a UL DCI format (for example, 0_1, 0_2)), or may be a UE-group common DCI format.

(Simultaneous Beam Update for Multiple CC)

In Rel. 16, one MAC CE can update beam indices (TCI states) of a plurality of CCs.

The UE can be configured with up to two applicable CC lists (for example, applicable-CC-list) through RRC. In a case that two applicable CC lists are configured, two applicable CC lists may respectively correspond to intra-band CA in FR1 and intra-band CA in FR2.

The TCI state activation MAC CE for PDCCH activates the TCI states associated with the same CORESET ID on all BWPs/CCs in the applicable CC list.

The TCI state activation MAC CE for PDSCH activates the TCI states on all BWPs/CCs in the applicable CC list.

A A-SRS/SP-SRS spatial relation activation MAC CE activates the spatial relations associated with the same SRS resource ID on all BWPs/CCs in the applicable CC list.

For example, the UE is configured with the applicable CC list indicating CCs #0, #1, #2, and #3, and a list indicating 64 TCI states for the CORESET for each CC or the PDSCH. In a case that one TCI state in CC #0 is activated by the MAC CE, the corresponding TCI states are activated in CCs #1, #2, and #3.

A study is underway that such simultaneous beam update is applicable only to single TRP case.

For PDSCH, the UE may be based on a procedure A below.

[Procedure A]

The UE receives an activation command for mapping up to eight TCI states to the codepoint of the DCI field (TCI field) in one CC/DL BWP or in one set of CCs/BWPs. In a case that one set of TCI state IDs are activated for one set of CCs/DL BWPs, the, the applicable list of CC is decided in the CC indicated in the activation command, and the same set of TCI states are applied to all DL BWPs in the indicated CC. Only in a case that the UE is not provided with a plurality of different values of the CORESET pool indices (CORESETPoolIndex) in a CORESET information element (ControlResourceSet), and is not provided with at least one TCI codepoint mapped to two TCI states, one set of TCI state IDs can be activated for one set of CCs/DL BWPs.

For PDCCH, the UE may be based on a procedure B below.

[Procedure B]

In a case that the UE is provided with up to two lists for simultaneous TCI state activation by a simultaneous TCI update list (at least one of simultaneousTCI-UpdateList-r16 and simultaneousTCI-UpdateListSecond-r16) by way of a simultaneous TCI cell list (simultaneousTCI-CellList), the UE applies antenna port quasi co-location (QCL) provided by the TCI states having the same activated TCI state ID value to the CORESET having an index p in all configured DL BWPs of all configured cells in one list decided from a serving cell index provided by a MAC CE command. Only in the case that the UE is not provided with a plurality of different values of the CORESET pool indices (CORESETPoolIndex) in a CORESET information element (ControlResourceSet), and is not provided with at least one TCI codepoint mapped to two TCI states, the simultaneous TCI cell list can be provided for simultaneous TCI state activation.

For a semi-persistent (SP)/aperiodic (AP)-SRS, the UE may be based on a procedure C below.

[Procedure C]

In a case that spatial relation information (spatialRelationInfo) for a SP or AP-SRS resource configured by a SRS resource information element (higher layer parameter SRS-Resource) is activated/updated for one set of CCs/BWPs by the MAC CE, then, the applicable list of CC is indicated by a simultaneous spatial update list (higher layer parameter simultaneousSpatial-UpdateList-r16 or simultaneousSpatial-UpdateListSecond-r16), and the spatial relation information is applied to the SP or AP-SRS resources having the same SRS resource ID in all BWPs in the indicated CC. Only in the case that the UE is not provided with a plurality of different values of the CORESET pool indices (CORESETPoolIndex) in a CORESET information element (ControlResourceSet), and is not provided with at least one TCI codepoint mapped to two TCI states, the spatial relation information (spatialRelationInfo) for the SP or AP-SRS resource configured by the SRS resource information element (higher layer parameter SRS-Resource) is activated/updated for one set of CCs/BWPs by the MAC CE.

The simultaneous TCI cell list (simultaneousTCI-CellList) and the simultaneous TCI update list (at least one of simultaneousTCI-UpdateList1-r16 and simultaneousTCI-UpdateList2-r16) are lists of the serving cells that TCI relations can be simultaneously updated using the MAC CE. simultaneousTCI-UpdateList1-r16 and simultaneousTCI-UpdateList2-r16 do not include the same serving cell.

The simultaneous spatial update list (at least one of higher layer parameters, simultaneousSpatial-UpdatedList1-r16 and simultaneousSpatial-UpdatedList2-r16) is a list of the serving cells that the spatial relations can be simultaneously updated using the MAC CE. simultaneousSpatial-UpdatedList1-r16 and simultaneousSpatial-UpdatedList2-r16 do not include the same serving cell.

Here, the simultaneous TCI update list and the simultaneous spatial update list are configured indicated by the RRC, the CORESET pool index of the CORESET is configured by the RRC, and the TCI codepoint mapped by the TCI state is indicated by the MAC CE.

(Unified/Common TCI Framework)

According to a unified TCI framework, the UL and DL channels can be controlled by a common framework. In the unified TCI framework, rather than defining the TCI state or the spatial relation per channel, unlike in Rel. 15, a common beam (common TCI state) is indicated and the common beam may be applied to all UL and DL channels, or a common beam for UL may be applied to all UL channels and a common beam for DL may be all DL channels.

One common beam for both the DL and the UL, or the common beam for DL and the common beam for UL (two common beams in total) are under study.

The UE may assume the same TCI state (joint TCI state, joint TCI pool, joint common TCI pool) for UL and DL. The UE may assume different TCI states for respective UL and DL (separate TCI state, separate TCI pool, UL separate TCI pool and DL separate TCI pool, separate common TCI pool, UL common TCI pool and DL common TCI pool).

UL and DL default beams may be aligned by beam management based on the MAC CE (MAC CE level beam indication). The default TCI state of the PDSCH may be updated to match the default UL beam (spatial relation).

The common beam/unified TCI state may be indicated by beam management based on the DCI (DCI level beam indication) from the same TCI pool (joint common TCI pool, joint TCI pool, set) for both UL and DL. M (>1) TCI states may be activated by the MAC CE. The UL/DL DCI may select one from M active TCI states. The selected TCI state may be applied to the channel/RS for both UL and DL.

The TCI pool (set) may be a plurality of TCI states configured by the RRC parameter, or may be a plurality of TCI states (active TCI states, active TCI pool, set) activated by the MAC CE among the plurality of TCI states configured by the RRC parameter. Each TCI state may be a QCL type A/D RS. An SSB, CSI-RS, or SRS may be configured as the QCL type A/D RS.

In an example in FIG. TA, the RRC parameter (information element) configures a plurality of TCI states for both UL and DL. The MAC CE may activate a plurality of TCI states among the plurality of configured TCI states. The DCI may indicate one of the plurality of activated TCI states. The DCI may be UL/DL DCI. The indicated TCI state may be applied to at least one (or all) of the UL/DL channel/RS. One piece of DCI may indicate both a UL TCI and a DL TCI.

In an example in FIG. 1A, one point may be one TCI state applied to both UL and DL, or two TCI states respectively applied to UL and DL.

At least one of the plurality of TCI states configured by the RRC parameter and the plurality of TCI states activated by the MAC CE may be referred to as a TCI pool (common TCI pool, joint TCI pool, TCI state pool). The plurality of TCI states activated by the MAC CE may be referred to as an active TCI pool (active common TCI pool).

Figure 1B:
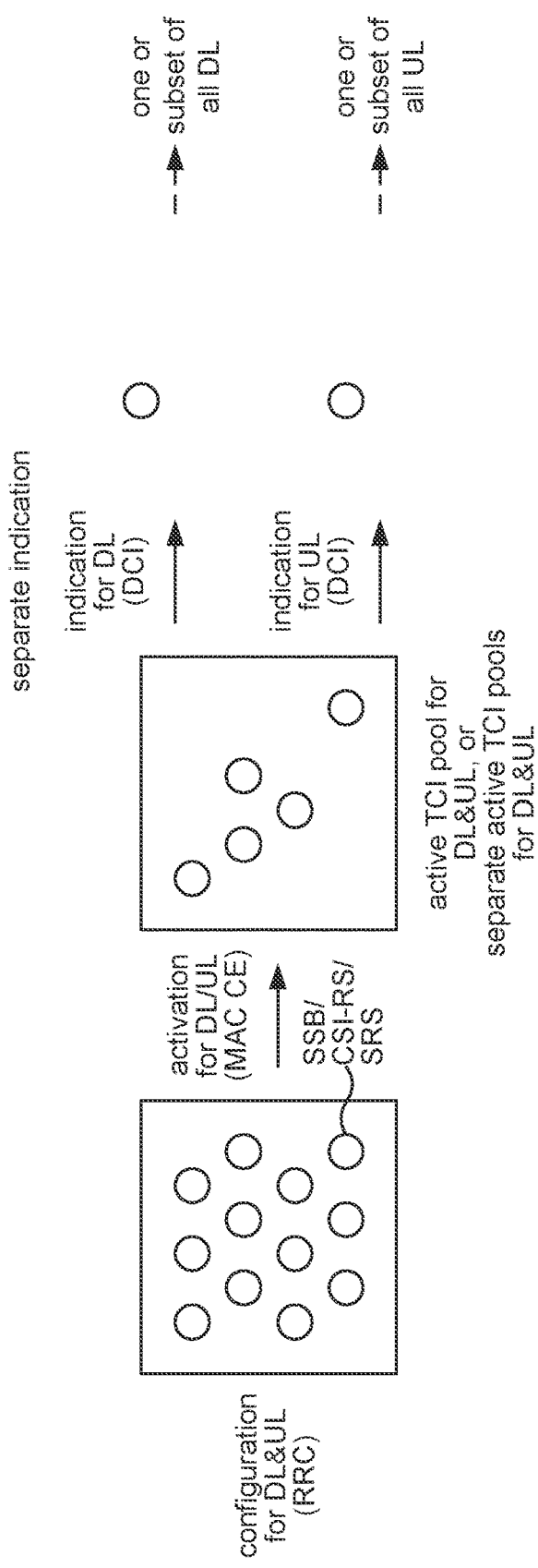

In an example in FIG. 1B, the RRC parameter configures a plurality of TCI states (joint common TCI state pool) for both DL and UL. The MAC CE may activate a plurality of TCI states (active TCI pool) among the plurality of configured TCI states. The (separate) active TCI pools for respective UL and DL may be configured/activated.

The DL DCI or a new DCI format may select (indicate) one or more TCI states (for example, one TCI state). The selected TCI state may be applied to one or more (or all) DL channels/RSs. The DL channel may be PDCCH/PDSCH/CSI-RS. The UE may use the operation for the TCI state (TCI framework) in Rel. 16 to determine a TCI state of each DL channel/RS. The UL DCI or a new DCI format may select (indicate) one or more TCI states (for example, one TCI state). The selected TCI state may be applied to one or more (or all) UL channels/RSs. The UL channel may be PUSCH/SRS/PUCCH. In this way, different pieces of DCI may indicate separately the UL TCI and the DL DCI.

Existing DCI format 1_2/1_2 may be used to indicate the common TCI state.

A common TCI framework may have separate TCI states for DL and UL.

A common TCI framework may have separate TCI states for DL and UL. It is not preferable that DCI format 1_1/1_2 is used to indicate a common TCI state for only UL.

(SPS PDSCH)

In NR, transmission/reception based on semi-persistent scheduling (SPS) is used. In the present disclosure, the SPS may be interpreted as downlink (DL) SPS.

The UE may activate or deactivate (release) a SPS configuration based on a downlink control channel (Physical Downlink Control Channel (PDCCH)). The UE may receive a corresponding SPS downlink shared channel (Physical Downlink Shared Channel (PDSCH)) based on the activated SPS configuration.

Note that in the present disclosure, PDCCH may be interpreted as downlink control information (Downlink Control Information (DCI)) transmitted using PDCCH, simply DCI, or the like. In the present disclosure, SPS, SPS PDSCH, SPS configuration, SPS occasion, SPS reception, SPS PDSCH reception, SPS scheduling. and the like may be interchangeably interpreted.

The DCI for activating or deactivating (releasing) the SPS configuration may be referred to as activation DCI (or SPS assignment DCI), deactivation DCI, or the like. The deactivation DCI may be referred to as release DCI, simply release, or the like.

The DCI may include cyclic redundancy check (CRC) bits scrambled with a specific RNTI (for example, s configured scheduling radio network temporary identifier (CS-RNTI)).

The DCI may be a DCI format for PUSCH scheduling (DCI format 0_0, 0_1, or the like), a DCI format for PDSCH scheduling (DCI format 1_0, 1_1, or the like), or the like. The DCI in which a plurality of fields indicate a given bit string may indicates SPS activation DCI or SPS release DCI.

The SPS configuration (also referred to as configuration information related to SPS) may be configured through higher layer signaling by the UE.

The configuration information related to the SPS (for example, a "SPS-Config" information element in the RRC) may include an index for identifying the SPS (also referred to as a SPS index, a SPS configuration index, or the like), information related to a SPS resource (for example, SPS period), information related to a PUCCH resource for the SPS, and the like.

The UE may determine a length of the SPS, a start symbol, and the like on the basis of a time domain allocation field in the SPS activation DCI.

The SPS may be configured for a special cell (SpCell) (for example, a primary cell (PCell) or a primary secondary cell (PSCell)), or may be configured for a secondary cell (SCell).

In Rel.16 NR, the UE may be provided with a plurality of SPS configurations. In this case, the UE may activate/deactivate the plurality of SPS configurations by one piece of activation/release DCI.

The DCI indicating separately a release per SPS configuration is referred to as separate release DCI. The DCI indicating jointly releases of a plurality of SPS configurations is referred to as joint release DCI.

In Rel.16 NR, the SPS configuration (for example, SPS-Config) reported through higher layer signaling may include at least one of the followings:

Information indicating a period (for example, periodicity),

Information indicating the number of HARQ processes (for example, nrofHARQ-Processes), Information related to an uplink control channel (for example, Physical Uplink Control Channel) resource (for example, PUCCH resource) used for an HARQ-ACK transmission (for example, n1PUCCH-AN), Table information used to determine a modulation and coding scheme (MCS) (for example, MCS table (mcs-Table)), Information indicating one of a plurality of DL SPS configurations in one BWP (for example, SPS configuration index, sps-ConfigIndex, sps-ConfigIndex-r16), Information related to an offset used to generate an HARQ process ID (for example, harq-ProcID-Offset, harq-ProcID-Offset-r16), Information for calculating a period of SPS PDSCH (for example, periodicityExt, periodicityExt-r16), Information indicating an HARQ-ACK codebook corresponding to HARQ-ACK for SPS PDSCH and ACK for SPS PDSCH release (for example, harq-CodebookID, harq-CodebookID-r16), Information indicating the repetition number of SPS PDSCH (for example, pdsch-AggregationFactor, pdsch-AggregatioFactor-r16).

At least one of the SPS activation DCI and release DCI may include at least one of the following information pieces.

Information related to assignment of a time domain resource (for example, one or more symbols) (time domain resource assignment (TDRA)), Information related to assignment of a frequency domain resource (for example, one or more physical resource blocks (PRBs) (also referred to as resource blocks (RBs))) (frequency domain resource assignment (FDRA)), Information related to a MCS (for example, MCS index), Information indicating an HARQ process (for example, HARQ process number (HPN), HARQ process ID), Information indicating a redundancy version (for example, redundancy version (RV)), Information related to a DL assignment (for example, DL assignment index (Downlink assignment index)), Information related to a PUCCH resource (for example, PUCCH resource identifier (PUCCH resource indicator)), Information related to a timing to feed back (transmit) an HARQ-ACK, an ACK/NACK) (for example, PDSCH-HARQ-ACK feedback timing identifier (PDSCH-to-HARQ feedback timing indicator)), Information related to a carrier (for example, carrier indicator (CI)), Information related to a bandwidth part (BWP) (for example, bandwidth part identifier (bandwidth part indicator (BI))), New data identifier (New Data Indicator (NDI)).

Figure 2:
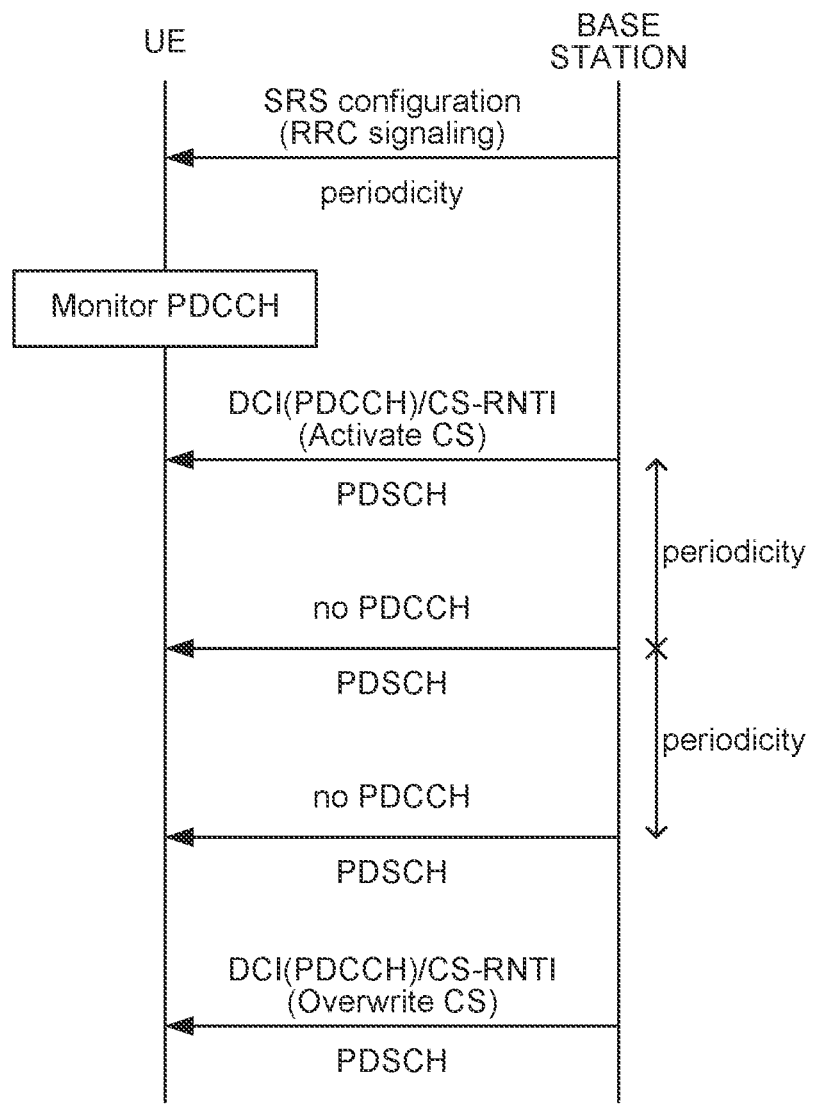
FIG. 2 is a diagram to show an example of a SPS PDSCH procedure.

In an example in FIG. 2, the UE receives the SPS configuration through RRC signaling. The SPS configuration includes the period of SPS PDSCH. The UE monitors the PDCCH. Once the UE receives the activation DCI for the configured scheduling (CS), the UE receives the PDSCH. The activation DCI has the CRC scrambled with the CS-RNTI. After that, the UE receives PDSCH without a PDCCH in accordance with the configured period. The UE may receive activation DCI for overwriting the configured scheduling (CS).

If the UE receives a PDSCH without the corresponding PDCCH, or if the UE receives a PDCCH indicating the SPS PDSCH release, the UE generates one corresponding HARQ-ACK information bit. If the UE receives a PDCCH indicating the SPS PDSCH release, the UE generate one corresponding HARQ-ACK information bit even if not receiving a PDSCH.

A case is under study that an HARQ-ACK feedback for a SPS PDSCH and an HARQ-ACK feedback for a dynamic PDSCH are multiplexed on one PUCCH.

For type 1 (semi-static) HARQ-ACK codebook, a study is underway to conform to at least one of derivation methods 1-1 to 1-3 below, in a case that an HARQ-ACK feedback for one or more SPS PDSCH receptions without a corresponding PDCCH is multiplexed with an HARQ-ACK feedback for at least one of a dynamically scheduled PDSCH and a SPS PDSCH release, or a case that an HARQ-ACK feedback for at least one of SPS PDSCH releases is multiplexed with an HARQ-ACK feedback for a dynamically scheduled PDSCH, or a case that only an HARQ-ACK feedback for a SPS PDSCH is reported.

[Derivation Method 1-1]

The HARQ-ACK bit location for the SPS PDSCH reception is derived by reusing the mechanism in Rel. 15 (based on a TDRA table row index and K1 indicated in the activation DCI).

[Derivation Method 1-2]

The mechanism in Rel. 15 is reused (based on a row index of the TDRA table indicated by the activation DCI (a value of a TDRA field) and K1 indicated by the release DCI (a value of a PDSCH-to-HARQ feedback indicator field)) to derive an HARQ-ACK bit location for the SPS PDSCH release having the separate release DCI.

[Derivation Method 1-3]

The HARQ-ACK bit location for a SPS PDSCH release with the joint release DCI is derived based on the TDRA table row index indicated in the activation DCI for a SPS PDSCH with the lowest SPS configuration index among the jointly released SPS configurations, and the TDRA table row index and K1 indicated in the release DCI.

In this way, for type 1 HARQ-ACK codebook, a study is underway that the HARQ-ACK bit location for a SPS PDSCH is based on the TDRA index and K1 in the activation DCI, and the HARQ-ACK bit location for the SPS separate release DCI/SPS joint release DCI is based on in the activation DCI the TDRA index and K1 in a release (for the lowest SPS configuration index).

For type 2 (dynamic) HARQ-ACK codebook, a study is underway to conform to at least one of derivation methods 2-1 to 2-3 below.

[Derivation Method 2-1]

The HARQ-ACK bit order for a SPS PDSCH release with the separate release DCI/joint release DCI is derived by reusing the mechanism in Rel. 15 (based on a downlink assignment index (DAI) and K1 indicated in the release DCI).

[Derivation Method 2-2]

The HARQ-ACK bit order for a SPS PDSCH with an associated PDCCH is derived by reusing the mechanism in Rel. 15 (based on the DAI and K1 indicated in the activation DCI).

[Derivation Method 2-3]

In the case that an HARQ-ACK feedback for one or more SPS PDSCH receptions without a corresponding PCCCH is multiplexed with an HARQ-ACK feedback for at least one of a dynamically scheduled PDSCH and a SPS PDSCH release, HARQ-ACK bits for one or more SPS PDSCH receptions without a corresponding PCCCH are appended after HARQ-ACK bits for at least one of the dynamically scheduled PDSCH and the SPS PDSCH release. An order of the appended HARQ-ACK bits may be firstly in combination of the SPS configuration index and the serving cell index in ascending order of DL slot per {SPS configuration index, serving cell index}, secondarily in ascending order of SPS configuration index per serving cell index, and thirdly in ascending order of serving cell index.

In this way, for type 2 HARQ-ACK codebook, the HARQ-ACK bit order for a SPS PDSCH is based on the DAI and K1 in the activation DCI. A study is underway that the HARQ-ACK bit order for the SPS separate release DCI/SPS joint release DCI is based on the DAI and K1 in the release DCI.

The UE validates, for scheduling activation, scheduling release, DL SPS assignment PDCCH, or configured UL grant type 2 PDCCH, states 1 to 4 below.

[State 1] The CRC of a corresponding DCI format is scrambled with CS-RNTI provided by cs-RNTI.
[State 2] A new data indicator field in the DCI format for an enabled transport block is set to '0'.
[State 3] If a DFI flag is present in the DCI format, a DFI flag field is set to '0'.
[State 4] In a case that validation is for scheduling activation, and a PDSCH-to-HARQ timing indicator field is present in the DCI format, the PDSCH-to-HARQ timing indicator field is an inapplicable value from dl-DataToUL-ACK.

If the UE is provided with a single configuration for UL grant type 2 PUSCH or SPS PDSCH, and all fields in the DCI format are set in accordance with a specification table (for example, FIG. 3A), validation of the DCI format is achieved.

If the UE is provided with one or more configurations for UL grant type 2 PUSCH or SPS PDSCH, the UE conforms to procedures 1 and 2 below.

[Procedure 1]
If the UE is provided with Type2Configuredgrantconfig-ReleaseStateList or SPS-ReleaseStateList, a value of the HARQ process number field in the DCI format indicates a corresponding entry for scheduling release of one or more UL grant type 2 PUSCH or SPS PDSCH configurations.

[Procedure 2]
If the UE is not provided with Type2Configuredgrantconfig-ReleaseStateList or SPS-ReleaseStateList, a value of the HARQ process number field in the DCI format indicates a release for UL grant type 2 PUSCH or SPS PDSCH configuration corresponding to a value the same as a value provided by Configuredgrantconfig-index or SPS config-index.

In the case that all fields in the DCI format are set in accordance with the specification table (for example, FIG. 3B), validation of the DCI format is achieved. If validation is achieved, the UE considers the information in the DCI format as a valid activation or valid release for DL SPS or configured UL grant type 2. If validation is not achieved, the UE discards the information in the DCI format.

For a SPS PDSCH release, a special value of a special field (new data indicator (NDI), downlink feedback information (DFI), redundancy version (RV), modulation and coding scheme (MCS), frequency domain resource assignment (FDRA), and HARQ process number (HPN)) (for example, FIGS. 3A and 3B) is reused for SPS configuration index indication (validation).

The UE is expected to provide the HARQ-ACK information depending on a SPS PDSCH after N symbols from the last symbol of a PDCCH providing a SPS PDSCH release. If processingType2ENabled of PDSCH-ServingCellConfig is set to enable for the serving cell with the PDCCH providing the SPS PDSCH release, N=5 for p=0, N=5.5 for p=1, and N=11 for p=2, otherwise, N=10 for p=0, N=12 for p=1, N=22 for p=2, and N=25 for p=3. Here, p corresponds to the smallest SCS configuration between the SCS configuration of the PDCCH providing the SPS PDSCH release and the SCS configuration of a PUCCH carrying HARQ-ACK information in response to a SPS PDSCH release.

In this way, the HARQ-ACK for the SPS PDSCH release follows after N symbols from the PDCCH.

(PUCCH Resource Determination)

After RRC connection (in a case that the UE is provided with a dedicated PUCCH resource configuration), the UE transmits the HARQ-ACK information on the PUCCH.

The UE determines an HARQ-ACK feedback timing (K1). K1 corresponds to a period (for example, a slot) from receiving a DL transmission (for example, PDSCH) until transmitting an HARQ-ACK for the DL transmission. Information related to HARQ-ACK timing (K1) may be included in the DCI used for scheduling of a PDSCH.

A network (for example, a base station) may use a given field in the DCI scheduling a PDSCH (or a PDCCH) to notify the UE of K1. For example, a bit value specified by a given field in the DCI may be associated with a given value (for example, {1, 2, 3, 4, 5, 6, 7, 8}). Alternatively, a bit value specified by a given field in the DCI may be associated with a value configured through higher layer signaling.

The UE in a case of receiving the DCI scheduling a PDSCH, determines a timing of feeding back an HARQ-ACK for the PDSCH based on the information included in the DCI.

Figure 4:
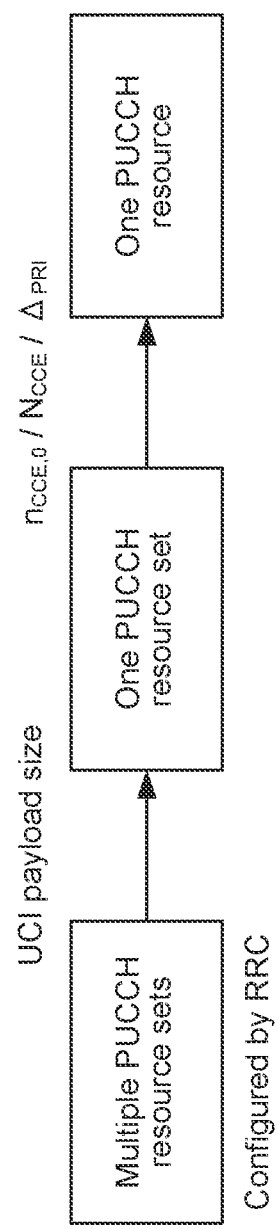
FIG. 4 is a diagram to show an example of a PUCCH resource determination.

The UE determines a PUCCH resource used to transmit an HARQ-ACK based on steps 1 and 2 below (FIG. 4).

[Step 1]
The UE determines a PUCCH resource set used in a slot to transmit an HARQ-ACK.

The UE is notified of (configured with) one or more PUCCH resource sets through higher layer signaling. The PUCCH resource set may include one or more PUCCH resources. For example, the UE may be notified of K PUCCH resource sets (for example, $1 \leq K \leq 4$) from the base station. Each PUCCH resource set may include M PUCCH resources (for example, $8 \leq M \leq 32$ or $1 \leq M \leq 8$).

The UE may determine a single PUCCH resource set from K configured PUCCH resource sets based on a payload size of UCI (UCI payload size). The UCI payload size may be the number of bits of the UCI not including a cyclic redundancy check (CRC: Cyclic Redundancy Code) bit.

Figure 5:
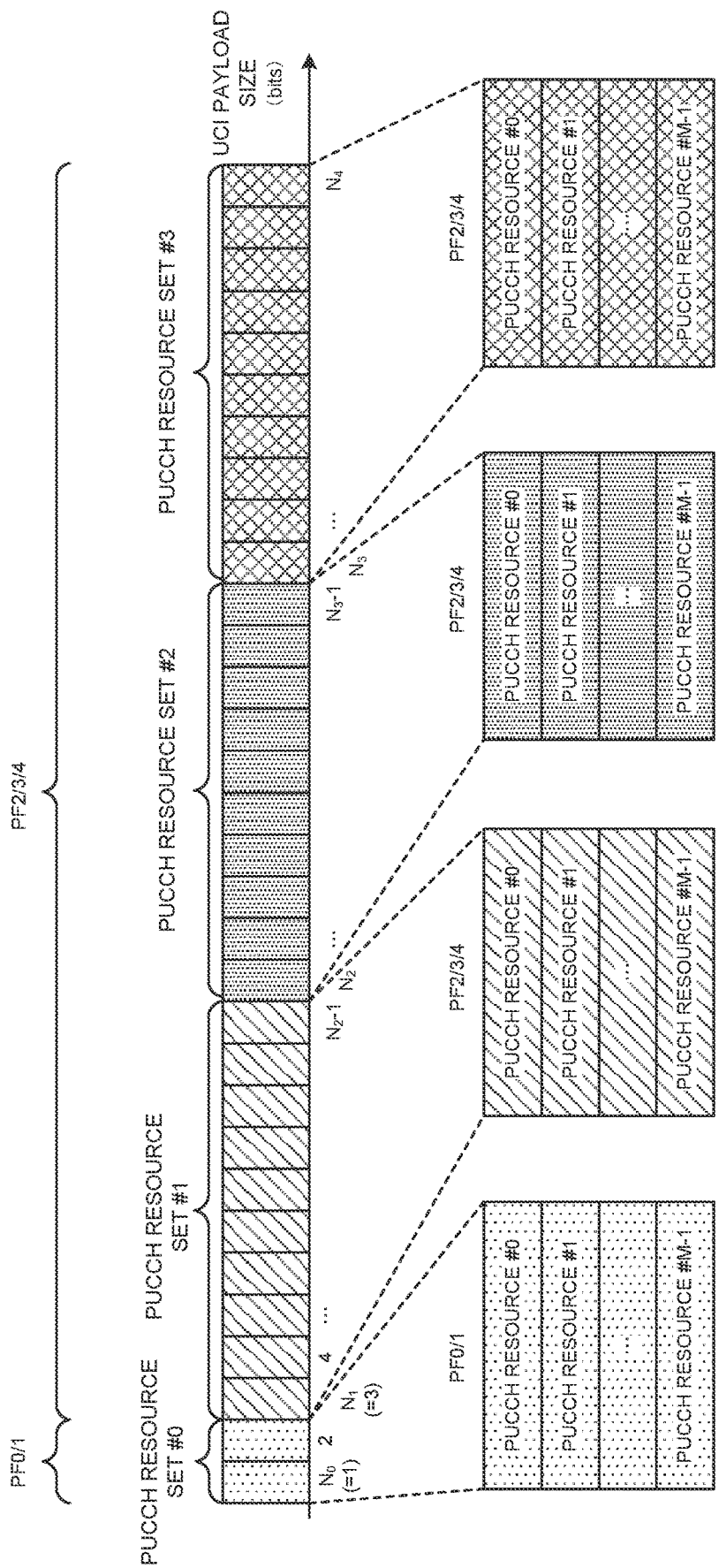
FIG. 5 is a diagram to show an example of a PUCCH resource set determination.

In an example in FIG. 5, assume that K=4 holds, and four PUCCH resource sets #0 to #3 are configured from the base station for UE through higher layer signaling. Assume that each of PUCCH resource sets #0 to #3 includes M PUCCH resources #0 to #M−1 (for example, $8 \leq M \leq 32$). Note that the number of PUCCH resources included in each PUCCH resource set may be the same or different.

Each PUCCH resource configured for the UE may include a value of at least one of parameters below (also referred to as a field, information, or the like). Note that a range of a possible value per PUCCH format may be defined for each parameter.

A symbol that PUCCH allocation is started (start symbol)
The number of symbols allocated for the PUCCH in slots (a period allocated for the PUCCH)
An index of a resource block that PUCCH allocation is started (physical resource block (PRB))
The number of PRBs allocated for the PUCCH
Whether or not frequency hopping is enabled for the PUCCH
A frequency resource of the second hop in a case that frequency hopping is enabled, an initial cyclic shift index An index of an orthogonal spreading code (for example, OCC: Orthogonal Cover Code) in the time domain, a length of OCC used for block spread before discrete Fourier transform (DFT) (also referred to as an OCC length, a spread ratio, or the like)

An index of OCC used for block spread after DFT (block-wise spreading).

As in the example, in the case that the UE is configured with PUCCH resource sets #0 #3, the UE selects any PUCCH resource set based on the UCI payload size.

For example, in a case that UCI payload size is one bit or two bits, PUCCH resource set #0 is selected. In a case that the UCI payload size is not less than three bits and not more than $N_2-1$ bits, PUCCH resource set #1 is selected. In a case that the UCI payload size is not less than $N_2$ bits and not more than $N_3-1$ bits, PUCCH resource set #2 is selected. Similarly, in a case that the UCI payload size is not less than $N_3$ bits and not more than $N_3-1$ bits, PUCCH resource set #3 is selected.

In this way, a range of the UCI payload size that PUCCH resource set #i (i=0, K-1) is selected is expressed as not less than $N_i$ bits and not more than $N_{i+1}-1$ bits (i.e., $\{N_i, \ldots, N_{i+1}-1\}$ bits).

Here, start positions (start bit numbers) $N_0$ and $N_1$ of the UCI payload sizes for PUCCH resource sets #0 and #1 may be 1 and 3, respectively. This allows PUCCH resource set #0 to be selected in a case of transmitting the UCI of not more than two bits, and thus, PUCCH resource set #0 may include PUCCH resources #0 to #M-1 for at least one of PF0 and PF1. On the other hand, any of PUCCH resource sets #1 to #3 is selected in a case of transmitting the UCI exceeding two bits, and thus, PUCCH resource sets #1 to #3 may include PUCCH resources #0 to #M-1 for at least one of PF2, PF3, and PF4.

In a case of i=2, . . . , K-1, information (start position information) indicating the start position ($N_i$) of the UCI payload size for PUCCH resource set #i may be notified to (configured for) the UE through higher layer signaling. The start position ($N_i$) may be UE-specific. For example, the start position ($N_i$) may be set to a value in a range of not less than 4 and not more than 256 (for example, a multiple of four). For example, information indicating each of the start positions ($N_2$, $N_3$) of the UCI payload sizes for PUCCH resource sets #2 and #3 is notified to the UE through higher layer signaling (for example, user-specific RRC signaling).

The maximum payload size of the UCI for each PUCCH resource set is given by $N_K-1$. $N_K$ may be explicitly notified to (configured for) the UE through higher layer signaling and/or the DCI, or may be implicitly derived. For example, $N_0=1$ and $N_1=3$ may be defined by the specification, and $N_2$ and $N_3$ may be notified through higher layer signaling. $N_4$ may be defined by the specification (for example, $N_4=1706$).

In this way, the UE selects one PUCCH resource set from one or more PUCCH resource sets configured by the higher layer, based on the UCI payload size (for example, the HARQ-ACK bits in a case that the UCI is an HARQ-ACK).

[Step 2]

The UE determines one PUCCH resource from one or more PUCCH resources included in the PUCCH resource set.

For example, the UE may determine a PUCCH resource used to transmit the UCI from M PUCCH resources included in the determined PUCCH resource set, based on at least one of the DCI and the implicit information (also referred to as implicit indication information, an implicit index, or the like).

The UE can determine a single PUCCH resource used to transmit the UCI from among PUCCH resources #0 to #M-1 included in the PUCCH resource set selected based on the UCI payload size, based on at least one of a field (PUCCH resource indicator (PRI) field) in the DCI and a CCE for a PDCCH carrying the DCI (an index of the first CCE corresponding to the PDCCH, the number of CCEs in the CORESET for the PDCCH).

The number M of PUCCH resources in one PUCCH resource set may be configured through higher layer signaling. For example, in a case that eight or less PUCCH resources are configured through higher layer signaling, the PUCCH resource in the PUCCH resource set may be notified by a field of three bits (PRI) in the DCI. The number of bits of this field is not limited to three.

For PUCCH resource set 0 (the first PUCCH resource set, in a case that M is more than eight), the UE may determine one PUCCH resource in the PUCCH resource set, based on the PRI ($\Delta_{PRI}$) in the scheduling DCI, an index ($N_{CCE, 0}$) of the first CCE for a PDCCH carrying the DCI, and the number of CCEs ($N_{CCE}$) in the CORESET for the PDCCH.

For PUCCH resource sets 1 to 3 (the second to fourth PUCCH resource sets), the UE may determine one PUCCH resource in the PUCCH resource set based on the PRI.

(Analysis)

In the common TCI framework, it is not clear what kind of DCI/what kind of DCI format is used for an indication of a TCI state (beam) in at least one of cases 1 to 3 below. In the common TCI framework, it is not clear how to transmit an HARQ-ACK for beam indication DCI of at least one of cases 1 to 3 below DCI.

[Case 1] A common beam indication for both UL and DL (or a case that a common beam indication for both UL and DL is configured, or a case of a common beam indication for both UL and DL)

[Case 2] A beam indication for only DL for a separate beam indication for UL and DL

[Case 3] A beam indication for only UL for a separate beam indication for UL and DL If the TCI state is not appropriately indicated, communication quality reduction, throughput reduction, or the like may be involved.

Thus, the inventors of the present invention came up with the idea of a method for indicating a TCI state.

Hereinafter, embodiments according to the present disclosure will be described in detail with reference to the drawings. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, ID, in indicator, and a resource ID may be interchangeably interpreted. In the present disclosure, "support," "control," "can control," "operate," and "can operate" may be interchangeably interpreted.

In the present disclosure, configure, activate, update, indicate, enable, specify, and select may be interchangeably interpreted.

In the present disclosure, a MAC CE and an activation/deactivation command may be interchangeably interpreted.

In the present disclosure, for example, the higher layer signaling may be any one or combinations of Radio Resource Control (RRC) signaling, Medium Access Control (MAC) signaling, broadcast information, and the like. In the present disclosure, RRC, RRC signaling, RRC parameter, higher layer, higher layer parameter, RRC information element (IE), and RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a spatial setting, a TCI state, a UL TCI state, a unified TCI state, a unified beam, a common TCI state, a common beam, a TCI assumption, a QCL assumption, a QCL parameter, a spatial domain reception filter, a UE spatial domain reception filter, a UE receive beam, a DL beam, a DL receive beam, a DL precoding, a DL precoder, a DL-RS, a QCL type D RS in TCI state/QCL assumption, a QCL type A RS in TCI state/QCL assumption, a spatial relation, a spatial domain transmission filter, a UE spatial domain transmission filter, a UE transmit beam, a UL beam, a UL transmit beam, a UL precoding, a UL precoder, and a PL-RS may be interchangeably interpreted. In the present disclosure, a QCL type X-RS, a DL-RS associated with a QCL type X, a DL-RS having a QCL type X, a source of a DL-RS, an SSB, a CSI-RS, and an SRS may be interchangeably interpreted.

UL DCI, DCI scheduling a UL channel (for example, PUSCH), and DCI format 0_x (x=0, 1, 2, . . . ) may be interchangeably interpreted. DL DCI, DCI scheduling a DL channel (PDSCH), and DCI format 1_x (x=0, 1, 2, . . . ) may be interchangeably interpreted.

In the present disclosure, HARQ-ACK information, ACK, and NACK may be interchangeably interpreted.

In the present disclosure, link direction, downlink (DL), uplink (UL), and one of UL and DL may be interchangeably interpreted.

In the present disclosure, a pool, a set, a group, and a list may be interchangeably interpreted.

In the present disclosure, a common beam, a common TCI, a common TCI state, a unified TCI, a unified TCI state, a TCI state applicable to DL and UL, a TCI state applied to a plurality of (kinds of) channels/RSs, a TCI state applicable to a plurality of kinds of channels/RSs, a PL-RS may be interchangeably interpreted.

In the present disclosure, a plurality of TCI states configured by the RRC, a plurality of TCI states activated by the MAC CE, a pool, a TCI state pool, an active TCI state pool, a common TCI state pool, a joint TCI state pool, a separate TCI state pool, a common TCI state pool for UL, a common TCI state pool for DL, a common TCI state pool configured/activated by the RRC/MAC CE, and TCI state information may be interchangeably interpreted.

In the present disclosure, a beam, a spatial domain filter, a spatial setting, a TCI state, a UL TCI state, a unified TCI state, a unified beam, a common TCI state, a common beam, a TCI assumption, a QCL assumption, a QCL parameter, a spatial domain reception filter, a UE spatial domain reception filter, a UE receive beam, a DL beam, a DL receive beam, a DL precoding, a DL precoder, a DL-RS, a QCL type D RS in TCI state/QCL assumption, a QCL type A RS in TCI state/QCL assumption, a spatial relation, a spatial domain transmission filter, a UE spatial domain transmission filter, a UE transmit beam, a UL beam, a UL transmit beam, a UL precoding, a UL precoder, and a PL-RS may be interchangeably interpreted. In the present disclosure, a QCL type X-RS, a DL-RS associated with a QCL type X, a DL-RS having a QCL type X, a source of a DL-RS, an SSB, a CSI-RS, and an SRS may be interchangeably interpreted.

In the present disclosure, a panel, an Uplink (UL) transmission entity, a point, a TRP, a spatial relation, a control resource set (CORESET), a PDSCH, a codeword, a base station, an antenna port of a signal (for example, demodulation reference signal (DMRS) port), an antenna port group of a signal (for example, DMRS port group), a group for multiplexing (for example, code division multiplexing (CDM) group, reference signal group, CORESET group), a CORESET pool, a CORESET subset, a CW, a redundancy version (RV), and a layer (MIMO layer, transmission layer, spatial layer) may be interchangeably interpreted. A panel Identifier (ID) and a panel may be interchangeably interpreted. In the present disclosure, a TRP index, a TRP ID, a CORESET pool index, an ordinal number of the TCI state in two TCI states (the first, the second), and a TRP may be interchangeably interpreted.

In the present disclosure, a TRP, a transmission point, a panel, a DMRS port group, a CORESET pool, and one of two TCI states associated with one codepoint of a TCI field may be interchangeably interpreted.

In the present disclosure, a single TRP, a single TRP system, a single TRP transmission, and a single PDSCH may be interchangeably interpreted. In the present disclosure, multi-TRP, multi-TRP system, multi-TRP transmission, and multi-PDSCH may be interchangeably interpreted. In the present disclosure, a single DCI, a single PDCCH, a single DCI based multi-TRP, and two TCI states on at least one TCI codepoint being activated may be interchangeably interpreted.

In the present disclosure, a single TRP, a channel using a single TRP, a channel using one TCI state/spatial relation, multi-TRP being not enabled by the RRC/DCI, a plurality of TCI states/spatial relations being not enabled by the RRC/DCI, and one CORESET pool index (CORESETPoolIndex) value being not configured for any CORESET and any codepoint in a TCI field being not mapped to two TCI states may be interchangeably interpreted.

In the present disclosure, multi-TRP, a channel using multi-TRP, a channel using a plurality of TCI states/spatial relations, multi-TRP being enabled by the RRC/DCI, a plurality of TCI states/spatial relations being enabled by the RRC/DCI, and at least one of single DCI based multi-TRP and multi-DCI based multi-TRP may be interchangeably interpreted.

In the present disclosure, multi-TRP based on multi-DCI, multi-DCI based multi-TRP, one CORESET pool index (CORESETPoolIndex) value being configured for a CORESET, and a CORESET pool index being configured for one or more CORESETs and a different CORESET pool index=0 or 1 being configured for a CORESET may be interchangeably interpreted.

In the present disclosure, multi-TRP based on single DCI, single DCI based multi-TRP, one codepoint in a TCI field at least being mapped to two TCI states, a CORESET pool index being not configured for a CORESET, and the same CORESET pool index being configured for all CORESETs may be interchangeably interpreted.

In the present disclosure, a TRP 1 (first TRP) may correspond to CORESET pool index=0, or may correspond to a first TCI state of two TCI states corresponding to one codepoint in a TCI field. A TRP 2 (second TRP) may correspond to CORESET pool index=1, or may correspond to a second TCI state of two TCI states corresponding to one codepoint in a TCI field.

In the present disclosure, a CC list, a serving cell list, a CC list in a cell group configuration (CellGroupConfig), an applicable list, a simultaneous TCI update list/second simultaneous TCI update list, simultaneousTCI-UpdateList1-r16/simultaneousTCI-UpdateList2-r16, a simultaneous TCI cell list, simultaneousTCI-CellList, a simultaneous spatial update list/second simultaneous spatial update list, simultaneousSpatial-UpdatedList1-r16/simultaneousSpatial-UpdatedList2-r16, a configured CC, a configured list, a BWP/CC in a configured list, all BWPs/CCs in a configured list, a CC indicated by an activation command, an indicated CC, a CC receiving a MAC CE, and information indicating a plurality of cells for updating at least one of a TCI state and a spatial relation may be interchangeably interpreted.

(Radio Communication Method)

In the present disclosure, a joint beam indication, a common beam indication, and a beam indication for UL and DL may be interchangeably interpreted.

In the present disclosure, a separate beam indication, a common beam indication for UL or DL, a beam indication for UL or DL, a UL beam indication, and a DL beam indication may be interchangeably interpreted.

The UE may receive information indicating a plurality of TCI states (RRC information element/MAC CE), and receive DCI (beam indication DCI, existing DCI format) indicating one or more TCI states of the plurality of TCI states and scheduling of one of PDSCH and PUSCH.

The UE may receive information indicating a plurality of TCI states (RRC information element/MAC CE), and receive DCI (beam indication DCI, new DCI format) indicating one or more TCI states of the plurality of TCI states and not indicating scheduling of any of PDSCH and PUSCH.

The UE may receive information indicating a plurality of TCI states (RRC information element/MAC CE), and receive DCI (beam indication DCI, new DCI format) including a field of at least one of one or more TCI states of the plurality of TCI states, a serving cell index, an HARQ timing indicator (PDSCH-to-HARQ timing indicator), a DAI, a TDRA, and a PRI.

The UE may apply one or more TCI states to a plurality of kinds of (UL/DL) signals (channels/RSs).

First Embodiment

In the case 1/2/3, at least one of the common beam indication DCI (format/field) and the HARQ-ACK information for the DCI may be defined (for example, FIG. 6).

In the case 1/2, an existing TCI field in DCI format 1_1/1_2 may indicate a common beam. In the case 1, an existing TCI field in DCI format 1_1/1_2 may indicate a common beam for both UL and DL. In the case 2, an existing TCI field in DCI format 1_1/1_2 may indicate a common beam for only DL.

In the case 1/2, the HARQ-ACK information (ACK/NACK) for a PDSCH scheduled by the beam indication DCI may be an ACK for the common beam indication. In the case 1, the HARQ-ACK information for a PDSCH scheduled by the beam indication DCI may be an ACK for the common beam indication for both UL and DL. In the case 2, the HARQ-ACK information for a PDSCH scheduled by the beam indication DCI may be an ACK for the common beam indication for only DL.

The DCI field/DCI format for the separate beam indication for only UL (case 3) may be any of Alternatives (Alt.) 1-1 to 1-3 below.

[[Alt. 1-1]] A new DCI format. A new DCI format for a beam indication without data scheduling is beneficial. It is preferable that the number of blind detections (BD) is not increased, for example, that a new DCI format has the same DCI payload as one of the existing DCI formats.

[[Alt. 1-2]] A new DCI field in DCI format 1_1/1_2. The base station may transmit DL DCI including a DL grant and a TCI field for only DL, for the beam indication for only UL.

[[Alt. 1-3]] A new DCI field or existing DCI field in DCI format 0 I/O 2 (for example, SRI field).

The ACK for the separate beam indication for only UL (case 3) may conform to any of Alternatives (Alt.) 2-1 to 2-3 below.

[[Alt. 2-1]] A mechanism of HARQ for a DCI reception (for example, SPS PDSCH release (DCI/PDCCH)). If the UE receives beam indication DCI, the UE may generate one HARQ-ACK information bit even if the UE does not receive a PDSCH (or even if a PDSCH is not scheduled by the beam indication DCI). In this way, if the UE receives beam indication DCI, the UE preferably feeds back an ACK to avoid a discrepancy in the common TCI state between the base station and the UE.

[[Alt. 2-2]] The HARQ-ACK information (ACK/NACK) of a PDSCH scheduled by the DCI.

[[Alt. 2-3]] At least one of a, b, and c below.

a) PUSCH transmission. The PUSCH transmission is recognized as an ACK for the beam indication.

b) ACK transmission for UL grant DCI. The ACK transmission may be introduced.

c) DCI reception corresponding to an ACK of the PUSCH.

The common beam indication may conform to Aspect 1-1 below.

<<Aspect 1-1>>

In the case 1/2, a TCI field in DCI format 1_1/1_2 may be used for a common beam indication. An operation in a case of no DL data to be transmitted is not clear.

To a DL beam indication (Alt. 1-2 in the case 1/2 or the case 3), any of Options 1 and 2 below may be applied.

[Option 1]

The beam indication without the DL data is not assumed. The common beam may be indicated with the DL assignment. The UE may assume that the beam indication DCI (for example, DCI format 1_1/1_2 or a new DCI format) is always with the DL data (DL assignment). If without the DL data, the base station may schedule dummy DL data, and the UE may transmit the HARQ-ACK information for reception of the dummy DL data.

[Option 2]

If without the DL data, the common beam indication may be transmitted. The UE may receive the beam indication DCI (for example, DCI format 1_1/1_2 or a new DCI format) without the DL data (DL assignment). If without the DL data, the base station may indicate only the beam indication information, and the UE may (similar to the SPS PDSCH release) transmit HARQ-ACK information for the DCI reception. This is more efficient than Option 1.

To a UL beam indication (Alt. 1-3 in the case 3), any of Options 1 and 2 may be applied.

[Option 1]

The beam indication without the UL data is not assumed. The common beam may be indicated with the UL grant. The UE may assume that the beam indication DCI (for example, DCI format 1_1/1_2 or a new DCI format or UL DCI) is always with the UL data (UL grant). If without the UL data, the base station may schedule dummy UL data, and the UE may transmit the dummy UL data.

[Option 2]

If without the UL data, the common beam indication may be transmitted. The UE may receive the beam indication DCI (for example, DCI format 1_1/1_2 or a new DCI format or UL DCI) without the UL data (UL assignment). If without the UL data, the base station may indicate only the beam indication information, and the UE may (similar to the SPS PDSCH release) transmit HARQ-ACK information for the DCI reception. This is more efficient than Option 1.

According to this embodiment, the common beam indication for UL/DL can be appropriately performed.

Second Embodiment

Alt. 1-1 in the first embodiment uses a new DCI format in the case 3. The new DCI format is described later.

Option 1 in the first embodiment may be used for the DL beam indication and the UL beam indication by reusing the existing TCI field in DCI format 1_1/1_2.

Assuming that the common beam is applied to only the PDSCH in the beam indication for only DL in the separate beam indication for DL and UL, it is reasonable to not consider the case without the DL data. However, in a case that the common beam is applied to the PDSCH and the PUSCH in the scenario of the common beam for DL and UL, it cannot be said that it is reasonable to not consider the case without the DL data (for example, a case without the DL data where with PUSCH data, and the base station tries to update the common beam). If a new DCI format for the beam indication for only UL in the separate beam indication for DL and UL is introduced, it is preferable to use the new DCI format similarly for another scenario.

In the case 1/2/3, at least one of the common beam indication DCI and the HARQ-ACK information for the DCI may be defined (for example, FIG. 7).

In the case 1/2, an existing TCI field in at least one of DCI format 1_1/1_2 and the new DCI format may indicate a common beam. In the case 1, an existing TCI field in at least one of DCI format 1_1/1_2 and the new DCI format may indicate a common beam for both UL and DL. In the case 2, an existing TCI field in at least one or DCI format 1_1/1_2 and the new DCI format may indicate a common beam for only DL. In the case 2, an existing TCI field in DCI format 1_1/1_2 may indicate a common beam for only DL.

In the case 1/2, at least one of the HARQ-ACK information (ACK/NACK) for a PDSCH scheduled by the beam indication DCI and the mechanism of HARQ for new DCI format reception (for example, the mechanism similar to the SPS PDSCH release) may be an ACK for the common beam indication. In the case 1, at least one of the HARQ-ACK information for a PDSCH scheduled by the beam indication DCI and the mechanism of HARQ for new DCI format reception (for example, the mechanism similar to the PDSCH SPS release) may be an ACK for the common beam indication for both UL and DL. In the case 2, at least one of the HARQ-ACK information for a PDSCH scheduled by the beam indication DCI and the mechanism of HARQ for new DCI format reception (for example, the mechanism similar to the SPS PDSCH release) may be an ACK for the common beam indication for only DL. In the case 2, the HARQ-ACK information for a PDSCH scheduled by the beam indication DCI may be an ACK for the common beam indication for only DL.

The DCI field/DCI format for the separate beam indication for only UL (case 3) may be any of Alternatives 1-1 to 1-3 below.

[[Alt. 1-1]] A new DCI format. A new DCI format for a beam indication without data scheduling is beneficial. It is preferable that the number of blind detections (BD) is not increased, for example, that a new DCI format has the same DCI payload as one of the existing DCI formats.

[[Alt. 1-2]] A new DCI field in DCI format 1_1/1_2. The base station may transmit DL DCI including a DL grant and a TCI field for only DL, for the beam indication for only UL.

[[Alt. 1-3]] A new DCI field or existing DCI field in DCI format 0_1/0_2 (for example, SRI field).

The ACK for the separate beam indication for only UL (case 3) may conform to any of Alternatives (Alt.) 2-1 to 2-3 below.

[[Alt. 2-1]] A mechanism of HARQ for a DCI reception (for example, SPS PDSCH release (DCI/PDCCH)). If the UE receives beam indication DCI, the UE may generate one HARQ-ACK information bit even if the UE does not receive a PDSCH (or even if a PDSCH is not scheduled by the beam indication DCI). In this way, if the UE receives beam indication DCI, the UE preferably feeds back an ACK to avoid a discrepancy in the common TCI state between the base station and the UE.

[[Alt. 2-2]] The HARQ-ACK information (ACK/NACK) of a PDSCH scheduled by the DCI.

[[Alt. 2-3]] At least one of a, b, and c below.
a) PUSCH transmission. The PUSCH transmission is recognized as an ACK for the beam indication.
b) ACK transmission for UL grant DCI. The ACK transmission may be introduced.
c) DCI reception corresponding to an ACK of the PUSCH.

If the new DCI format is introduced, the common UL/DL beam indication and the separate UL/DL beam indication for only DL are useful. Whether or not the UE monitors the new DCI format besides the TCI state in DCI format 1_1/1_2 may depend on the higher layer configuration. The new DCI format may be a beam (TCI) indication without (UL/DL) data scheduling.

If a new DCI format for the beam indication is configured, the UE may be required to only monitor the new DCI format.

If the number of blind detections is not increased for the new DCI format (for example, in a case that the new DCI format has a DCI size the same as one of the existing DCI formats), monitoring the new DCI format is not disadvantageous, and thus, the UE may always monitor the new DCI format for the case 1/2/3.

If the number of blind detections is increased for the new DCI format (for example, in a case that the new DCI format has a DCI size different from one of the existing DCI formats), monitoring the new DCI format increases complexity of the UE, and thus, whether or not the new DCI format is used for the common beam indication is preferably configurable.

If the UE is configured to monitor the new DCI format, at least one of the existing TCI field in DCI format 1_1/1_2 and the new DCI format may indicate the common beam, the UE may assume that only the new DCI format indicates the common beam, or at least one of the HARQ-ACK information (ACK/NACK) for a PDSCH scheduled by the beam indication DCI and the mechanism of the HARQ for the DCI (for example, the SPS PDSCH release) reception may be an ACK for the common beam indication.

If the UE is not configured to monitor the new DCI format, the existing TCI field in DCI format 1_1/1_2 may indicate the common beam, or the HARQ-ACK information (ACK/NACK) for a PDSCH scheduled by the beam indication DCI may be an ACK for the common beam indication.

Whether or not the UE supports the new DCI format reception may conform to the UE capability.

<<Variations>>

DL assignment DCI (DCI format 1_1/1_2) not performing DL data scheduling may be permitted. The UE may transmit the HARQ-ACK information indicating a successful reception (ACK) of the beam indication DCI (DCI format 1_1/1_2) in accordance with the method similar to the HARQ-ACK information for the SPS PDSCH release (described above as for the "SPS PDSCH").

For example, as shown in FIG. 8, the beam indication DCI may perform the DL data (PDSCH) scheduling, or may not perform the DL data scheduling.

The DCI indicating the common beam for both UL and DL (joint beam indication, the case 1) is the DL assignment DCI (DCI format 1_1/1_2), and may perform the PDSCH scheduling. An ACK for this beam indication (a successful reception of the beam indication) may be an HARQ-ACK (ACK/NACK) for the PDSCH.

The DCI indicating the common beam for only DL (separate beam indication, the case 2) is the DL assignment DCI (DCI format 1_1/1_2), and may perform the PDSCH scheduling. An ACK for this beam indication (a successful reception of the beam indication) may be an HARQ-ACK (ACK/NACK) for the PDSCH.

The DCI indicating the common beam for both UL and DL (joint beam indication, the case 1) may be the new DCI format not performing the PDSCH scheduling. An ACK for this beam indication (a successful reception of the beam indication) may be the HARQ-ACK information directly transmitted to the DCI, similar to the HARQ-ACK information for the SPS PDSCH release.

The DCI indicating the common beam for only DL (separate beam indication, the case 2) may be the new DCI format not performing the PDSCH scheduling. An ACK for this beam indication (a successful reception of the beam indication) may be the HARQ-ACK information directly transmitted to the DCI, similar to the HARQ-ACK information for the SPS PDSCH release.

The DCI field/DCI format for the common beam indication for only UL (separate beam indication, the case 3) may be any of Alts. 1-1 to 1-3 described above. For example, this DCI may be the new DCI format not performing the PDSCH scheduling (Alt. 1-1). An ACK for this beam indication may conform to any of Alts. 2-1 to 2-3 described above. For example, this ACK (a successful reception of the beam indication) may be the HARQ-ACK information directly transmitted to the DCI, similar to the HARQ-ACK information for the SPS PDSCH release (Alt. 2-1).

According to this embodiment, the common beam indication for UL/DL can be appropriately performed.

Third Embodiment

In the case 1/2/3, a new DCI format indicates a beam.

In the case 1/3, a new DCI format (for example, for only DL beam, or for common beam for UL and UL) may have one TCI field.

In the case 2, a new DCI format (for example, for separate beam indication for only UL beam) may have another one TCI field.

In a case that the UE assumes the case 2 in addition to the case 1/3, two TCI fields for only DL/for common and for only UL may be assumed.

In a case of indicating a common beam for a plurality of CCs (multi-CC case), at least one of Options 1 and 2 below may be applied.

[Option 1]

One or two TCI fields in the new DCI format are applied to the CC in the CC list configured by the RRC.

[Option 2]

The new DCI field includes indication for a plurality of CCs. The DCI may include one or two TCI fields per CC. The DCI may be with a serving cell index, or without a serving cell index. In a case that the DCI is with a serving cell index, a common beam for a different CC may be indicated by the DCI. In a case that the DCI is without a serving cell index, different locations of one or two TCI fields may correspond to different serving cells in ascending order in the CC list. In this case, a special value may be set in one or two TCI fields for the CC with the common beam being not updated.

The new DCI field may be DCI dedicated for beam indication (without scheduling/triggering UL/DL data, SRS, CSI-RS, or CSI report). The new DCI field may have a field for scheduling/triggering at least one of UL/DL data, SRS, CSI-RS, and CSI report. The new DCI field may not be the DCI dedicated for beam indication.

The new DCI format may conform to at least one of Aspects 3-1 to 3-2.

<<Aspect 3-1>>

The number of blind detections is not increased for the new DCI format. The new DCI format may have a DCI size the same as one of the existing DCI formats.

The new DCI format may be designed to have a payload size the same as one of the existing DCI formats for UE-specific DCI. As a result, the number of blind detections may not be increased.

For example, if the new DCI format has the same payload size as DCI format 1_1, and a search space set is set for monitoring those two DCI formats, the number of blind detections is the same as a case that a search space set is set for monitoring only DCI format 1_1.

In this case, if a C-RNTI is used for two DCI formats, how the UE differentiates those two DCI formats having the same payload size is an issue.

How the UE differentiates the new DCI format may conform to at least one of differentiation methods A and B below.

[Differentiation Method A]

An RNTI used for CRC scrambling of the new DCI format (a new RNTI, for example, a beam indication RNTI) may be configured. If the UE is configured to monitor the new DCI format, the UE may try to perform blind detection for the new DCI format having CRC scrambled with the new RNTI.

Figure 9:
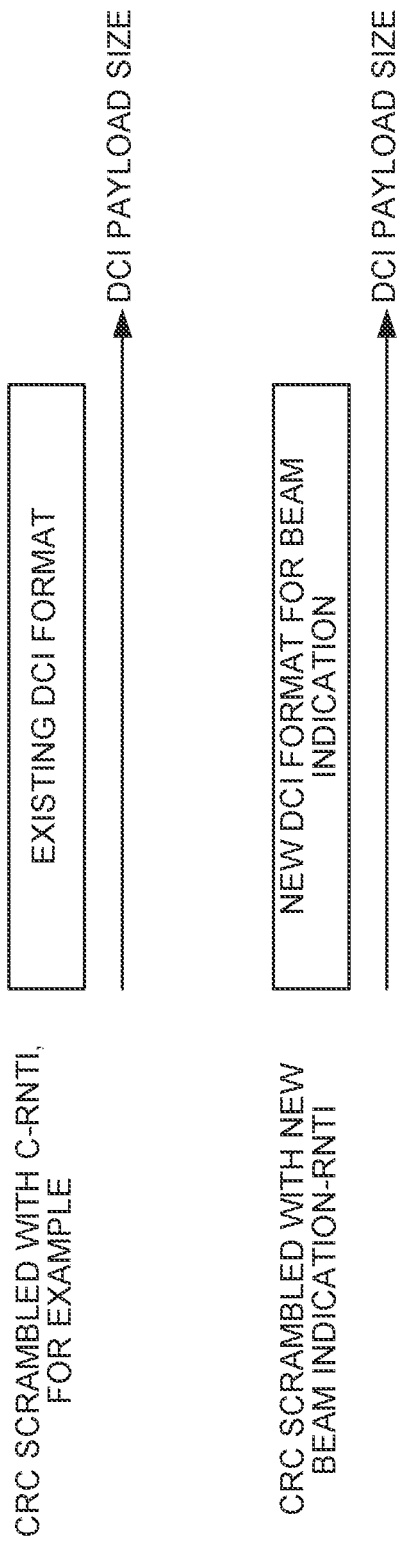
FIG. 9 is a diagram to show an example of a differentiation method A in Aspect 3-1.

In an example in FIG. 9, a payload size of a new DCI format for beam indication is equal to a payload size of the existing DCI format. An RNTI scrambling CRC of the new DCI format (for example, a beam indication RNTI) is different from the RNTI scrambling the CRC of the existing DCI format (for example, the C-RNTI).

[Differentiation Method B]

If a new DCI format/new DCI field is configured, a new DCI field for indicating the existing DCI format or the new DCI format is inserted into the existing DCI format. If the UE is configured to monitor the new DCI format, and the UE is indicated with the new DCI format by the new DCI field, the common beam may be indicated by the new DCI format. An RNTI scrambling CRC of the new DCI format may be the same as the RNTI scrambling the CRC of the existing DCI format (for example, the C-RNTI), or a different RNTI (for example, a new RNTI, a beam indication RNTI).

Figure 10:
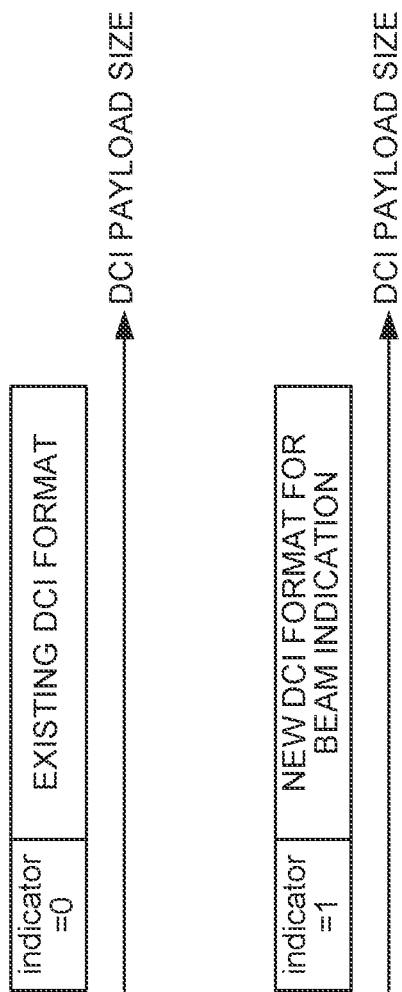
FIG. 10 is a diagram to show an example of a differentiation method B in Aspect 3-1.

In an example in FIG. 10, a payload size of a new DCI format for beam indication is equal to a payload size of the existing DCI format. Each of the existing DCI format and the new DCI format has an indicator field. A value of the indicator field in the existing DCI format is 0. A value of the indicator field in the new DCI format is 1.

<<Aspect 3-2>>

The number of blind detections is increased for the new DCI format. The new DCI format may have a DCI size different from one of the existing DCI formats.

If the UE is configured to monitor the new DCI format, the UE may use a payload (configured/defined in the specification) size of the new DCI format to try to perform blind detection for the new DCI format having CRC scrambled with the existing RNTI (e.g., C-RNTI).

The payload size (the number of bits) of the new DCI format may be configurable by the higher layer configuration. Any of the payload sizes of the new DCI formats may be different from the payload size of the existing DCI format. In this case, the new RNTI may be not be required. If the payload size of the new DCI format is the same as the payload size of any of the existing DCI formats, a new RNTI for differentiating the DCI format may be required.

Figure 11:
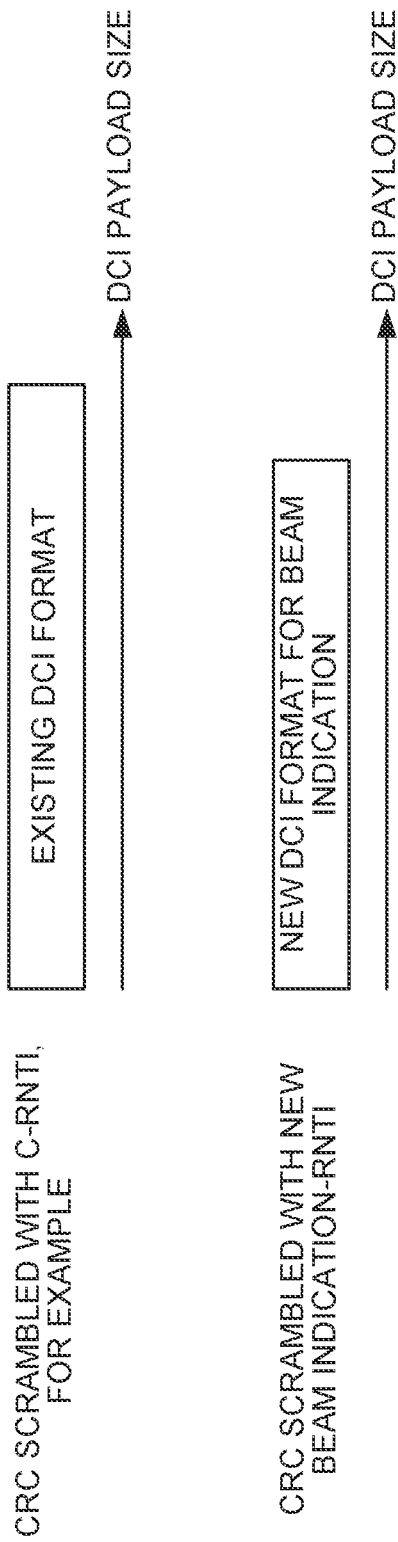
FIG. 11 is a diagram to show an example of DCI in Aspect 3-2.

In an example in FIG. 11, a payload size of a new DCI format for beam indication is different from a payload size of the existing DCI format. An RNTI scrambling CRC of the new DCI format may be the same as the RNTI scrambling the CRC of the existing DCI format (for example, the C-RNTI), or a different RNTI (for example, may be a new RNTI or a beam indication RNTI).

The payload size (the number of bits) of the new DCI format may be configurable/scalable for at least one of States 1 and 2 below.

[State 1] The TCI field is common for only DL/UL and DL, or for only UL.

[State 2] One piece of DCI indicates one set of TCI states for single TRP (for UL and DL), or one piece of DCI indicates a plurality sets of TCI states for multi-TRP (for UL and DL).

According to this embodiment, the UE can appropriately receive the common beam indication by the new DCI format.

Fourth Embodiment

In the third embodiment, it is not clear that in the case that the new DCI format having the same payload size as the existing DCI format is transmitted with not including a DL assignment, what DCI field is required in addition to the TCI field to enable the HARQ-ACK feedback.

The new DCI format for common beam indication can conform to an HARQ-ACK procedure for a SPS PDSCH. However, some enhancements can be thought to be introduced with taking some differences between the new DCI format and the SPS PDSCH release into account.

Figures 12A, 12B:
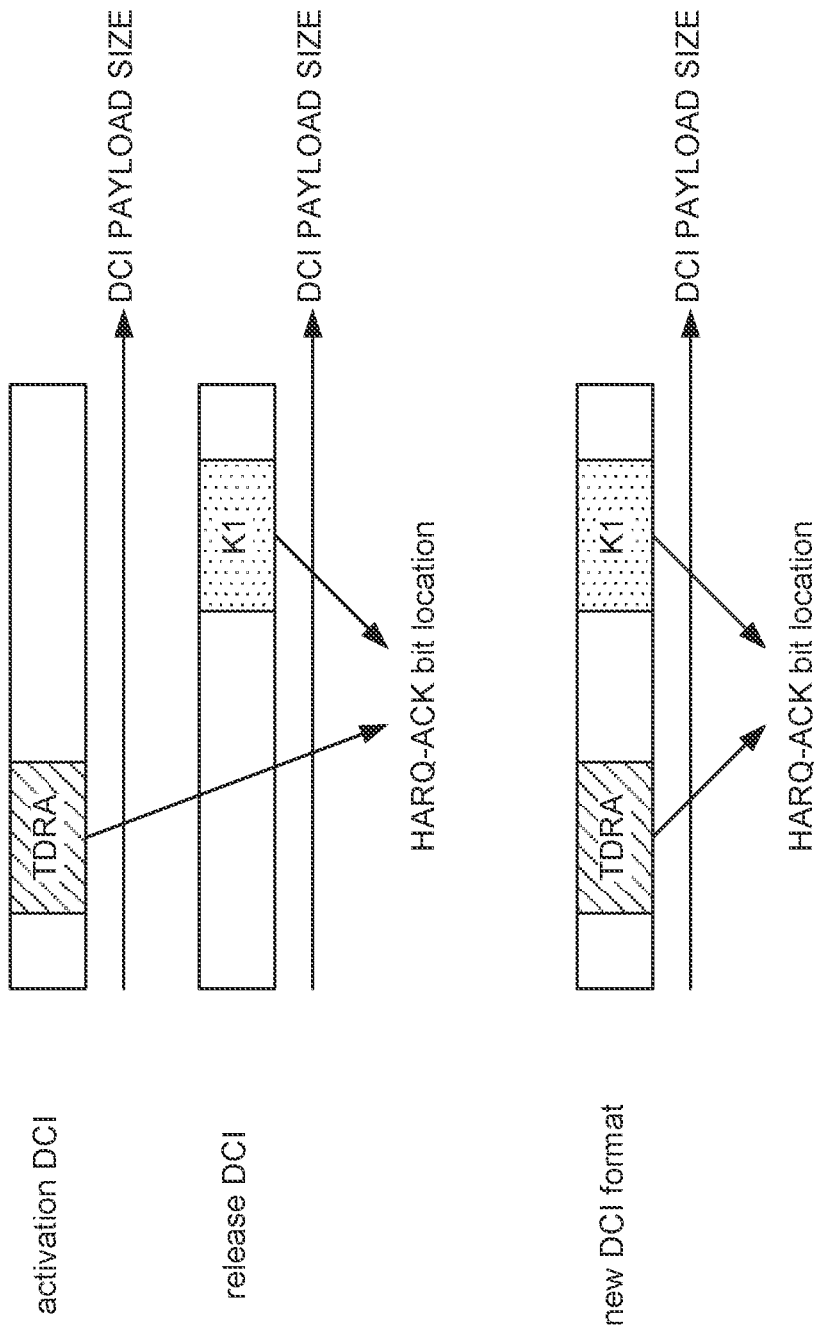
FIGS. 12A and 12B are diagrams to show examples of an HARQ-ACK bit location determination method according to a fourth embodiment.

As described above as for the "SPS PDSCH", for type 1 HARQ-ACK codebook, the HARQ-ACK information for the separate release DCI/joint release DCI for SPS PDSCH is associated with the TDRA index in the activation DCI (for the lowest SPS configuration index) (in an example in FIG. 12A). However, there is no activation DCI for the new DCI format for common beam indication. In the new DCI format, what field is required for facilitating the HARQ-ACK procedure is not clear.

For type 1 HARQ-ACK codebook, in a case that the HARQ-ACK feedback for the new DCI format and the HARQ-ACK feedback for the dynamically scheduled PDSCH are multiplexed (mapped) on one PUCCH, the HARQ-ACK bit location for the new DCI format may be derived based on the TDRA table row index and the K1 value. The HARQ-ACK procedure may be similar to the SPS PDSCH release by using two values.

The K1 (PDSCH-to-HARQ feedback timing indicator) value may be indicated by the new DCI format (in an example in FIG. 12B).

The TDRA table row index may be determined by at least one of Options 1 to 3 below.

[Option 1] The TDRA table row index is indicated in the new DCI format (TDRA field) (in the example in FIG. 12B).

[Option 2] The TDRA table row index is configured by the RRC.

[Option 3] A default value of the TDRA table row index is defined by the specification. For example, the default value may be the lowest or highest index/row index/codepoint.

In Option 1, the new DCI format includes the TDRA field. In Option 2 or 3, the new DCI format may not include the TDRA field.

According to this embodiment, the UE can appropriately report the HARQ-ACK information for the new DCI format in the case of using type 1 HARQ-ACK codebook.

Fifth Embodiment

As described above as for the "SPS PDSCH", for type 2 HARQ-ACK codebook, the HARQ-ACK information for the SPS PDSCH release DCI is associated with the DAI and K1 in the activation DCI/release DCI (in an example in FIG. 13A).

For type 2 HARQ-ACK codebook, in a case that the HARQ-ACK feedback for the new DCI format and the HARQ-ACK feedback for the dynamically scheduled PDSCH are multiplexed (mapped) on one PUCCH, the HARQ-ACK bit order for the new DCI format may be derived based on the DAI and K1 indicated in the new DCI format (in an example in FIG. 13B). The HARQ-ACK procedure may be similar to the SPS PDSCH release by using two values.

For type 2 HARQ-ACK codebook, the new DCI format may include a DAI field and a K1 (PDSCH-to-HARQ feedback timing indicator) field.

According to this embodiment, the UE can appropriately report the HARQ-ACK information for the new DCI format in the case of using type 2 HARQ-ACK codebook.

Sixth Embodiment

Figure 14:
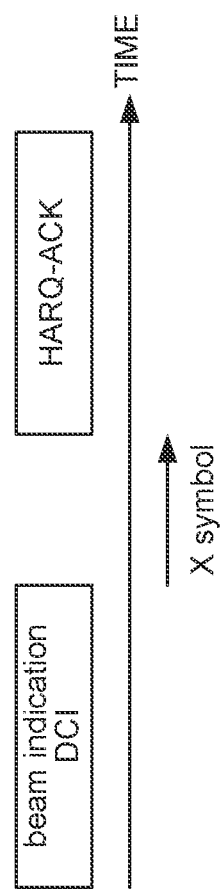
FIG. 14 is a diagram to show an example of an HARQ feedback timing according to a sixth embodiment.

The UE is expected to provide the HARQ-ACK information depending on the new DCI format for the common beam indication after X symbols from the last symbol of the PDCCH providing the common beam indication (in an example in FIG. 14). X may be the same as N for the SPS PDSCH release. The value of X may be reported as the UE capability different from the SPS PDSCH release. The value of X different from the value of N for the SPS PDSCH release may be applied to the new DCI format.

According to this embodiment, the UE can appropriately report the HARQ-ACK information for the new DCI format.

Seventh Embodiment

The new DCI format includes the PUCCH resource indicator (PRI) field. The UE may determine a PUCCH resource for transmitting the HARQ-ACK information for the new DCI format in accordance with the "PUCCH resource determination" described above.

At least one of the PRI in the new DCI format, the index of the first CCE corresponding to a PDCCH carrying the new DCI format, and the number of CCEs in a CORESET for the PDCCH may be used to indicate a PUCCH resource carrying the HARQ-ACK for the new DCI format for beam indication.

After RRC connection (in a case that the UE is provided with a dedicated PUCCH resource configuration), the UE may conform to Steps 1 and 2 below (may conform to the "PUCCH resource determination" described above) to transmit the HARQ-ACK information for the new DCI format.
[Step 1]
The UE determines one PUCCH resource set from a plurality of configured PUCCH resource sets based on an HARQ-ACK payload.
[Step 2]
The UE determines one PUCCH resource from a plurality of configured PUCCH resources among the selected PUCCH resource sets.

For PUCCH resource set 0 (the first PUCCH resource set, in a case that M is more than eight), the UE may determine one PUCCH resource in the PUCCH resource set, based on the PRI, the index of the first CCE, and the number of CCEs.

For PUCCH resource sets 1 to 3 (the second to fourth PUCCH resource sets), the UE may determine one PUCCH resource in the PUCCH resource set based on the PRI.

According to this embodiment, the UE can appropriately determine a PUCCH resource for transmitting the HARQ-ACK information for the new DCI format.

Eighth Embodiment

The new DCI format for common beam indication in at least one of the first to seventh embodiments may include at least one of fields below.
One or two TCI states. Or, one or two TCI states per serving cell (CC).
A serving cell (CC) index.
K1 (PDSCH-to-HARQ feedback timing indicator).
A DAI.
A TDRA.
A PRI.
According to this embodiment, the UE can appropriately report the HARQ-ACK information for the new DCI format.

Ninth Embodiment

The higher layer parameters (RRC information elements)/UE capability corresponding to at least one of the functions (features) according to the first to eighth embodiments may be defined. The UE capability may indicate that the UE supports the function.

The UE configured with the higher layer parameter corresponding to the function may perform the function. It may be defined that "the UE not configured with the higher layer parameter corresponding to the function does not perform the function."

The UE reporting the UE capability indicating that the function is supported may perform the function. It may be defined that "the UE not reporting the UE capability indicating that the function is supported does not perform the function."

In a case that the UE reports the UE capability indicating that the function is supported and is configured with the higher layer parameter corresponding to the function, the UE may perform the function. It may be defined that "in a case that the UE does not report the UE capability indicating that the function is supported, or is not configured with the higher layer parameter corresponding to the function, the UE does not perform the function."

The function may be the common beam indication/separate beam indication.

The UE capability may indicate up to how many (maximum number of) TCI states configured for common beam indication by the RRC the UE supports. The TCI state may include at least one of a TCI state for common beam indication, a UL TCI state for separate beam indication, and a DL TCI state for separate beam indication.

The UE capability may indicate up to how many (maximum number of) TCI states for common beam indication the UE supports. The TCI state may include at least one of a TCI state for common beam indication, a UL TCI state for separate beam indication, and a DL TCI state for separate beam indication.

The UE capability may indicate whether a different (separate) active TCI state pool per UL and DL is supported, and whether a joint/same TCI pool for UL and DL is supported.

The UE capability may indicate whether the UE supports the new DCI format reception (in the second embodiment).

According to this embodiment, the UE can achieve the above functions while maintaining compatibility with the existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 15:
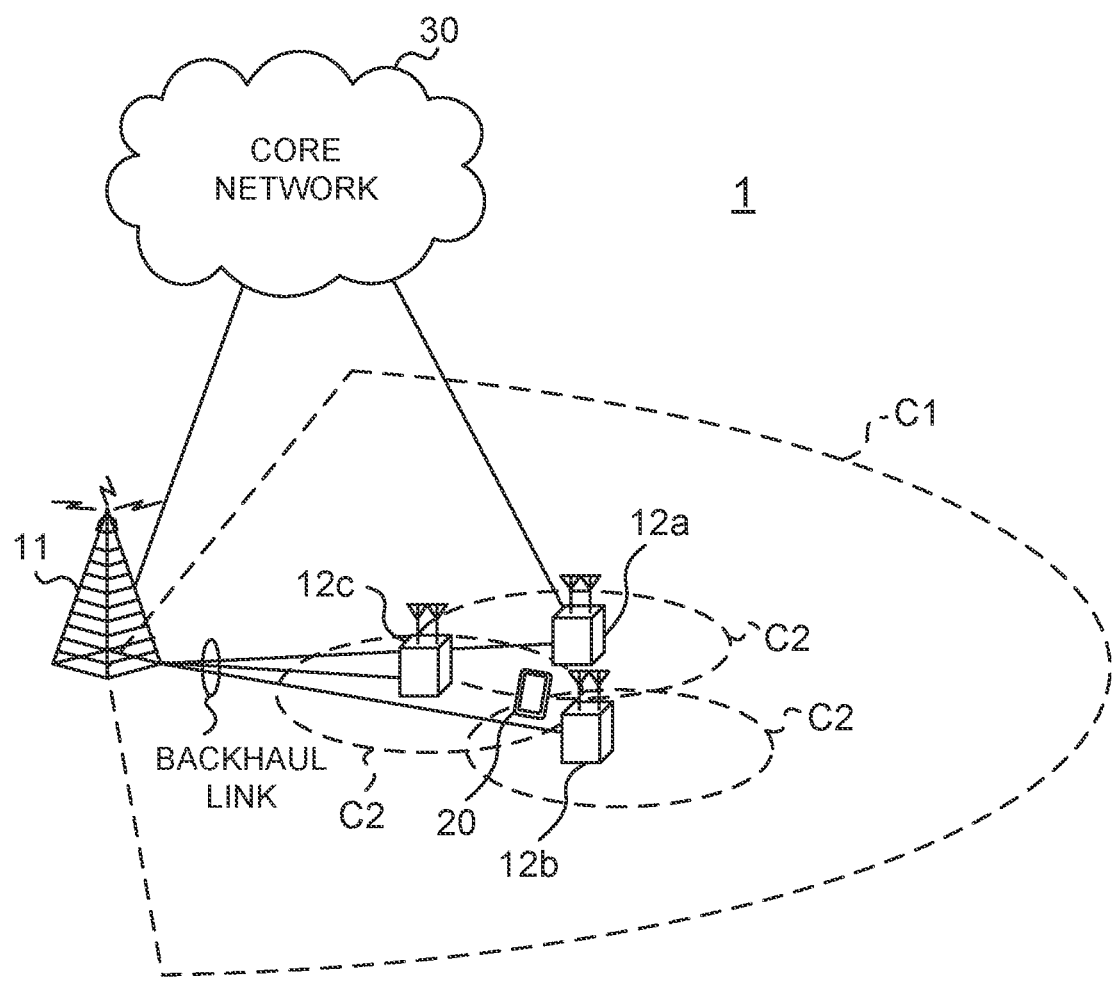
FIG. 15 is a diagram to show an example of a schematic structure of a radio communication system according to one embodiment.

FIG. 15 is a diagram to show an example of a schematic structure of a radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and a scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 16:
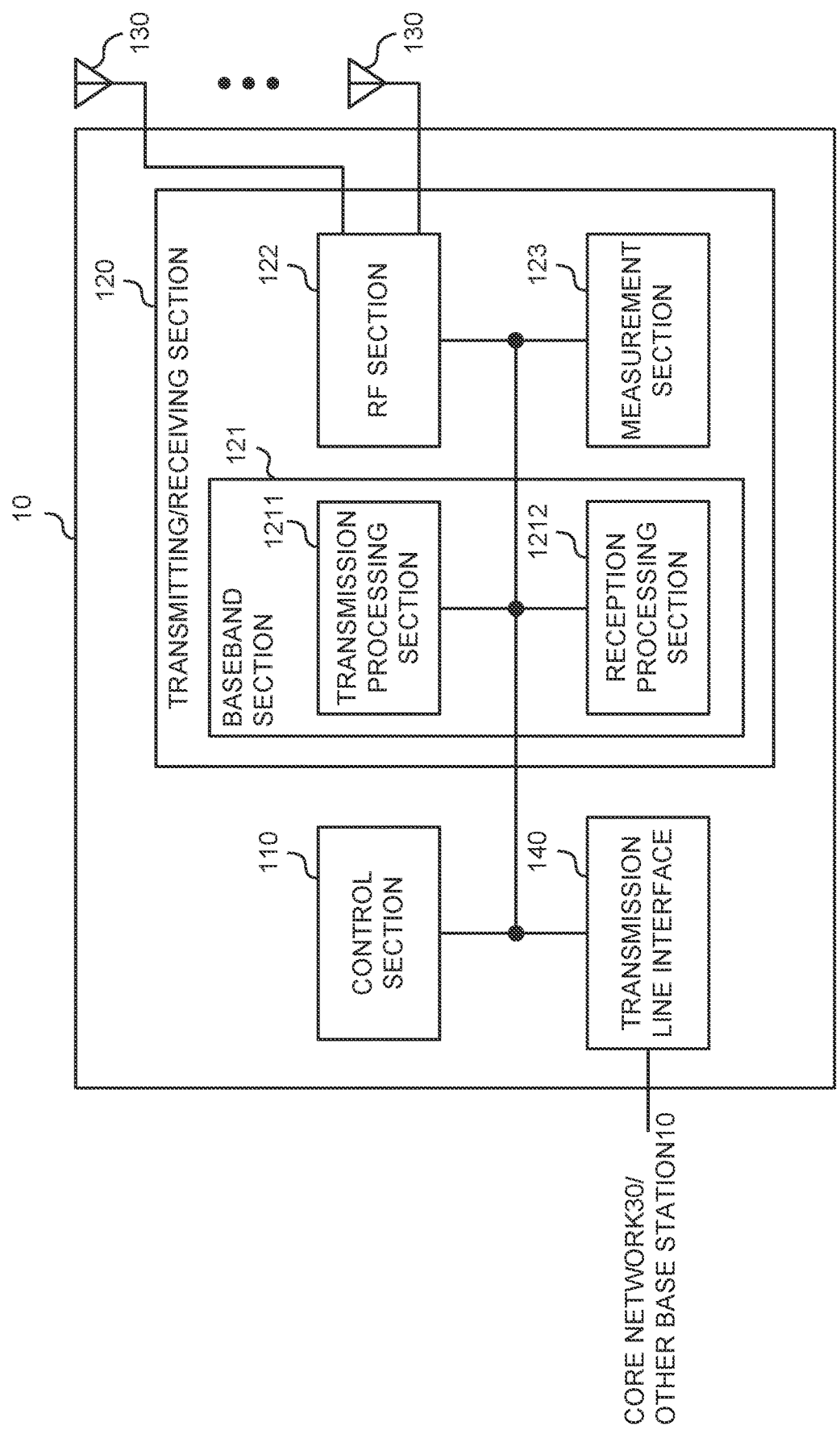
FIG. 16 is a diagram to show an example of a structure of a base station according to one embodiment.

FIG. 16 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate a bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 may transmit information indicating a plurality of transmission configuration indication (TCI) states, and transmit downlink control information indicating one or more TCI states of the plurality of TCI states and scheduling of one of a physical downlink shared channel and a physical uplink shared channel. The control section 110 may apply the one or more TCI states to a plurality of kinds of signals.

Information indicating a plurality of transmission configuration indication (TCI) states may be transmitted to transmit downlink control information indicating one or more TCI states of the plurality of TCI states and not indicating scheduling of any of a physical downlink shared channel and a physical uplink shared channel. The control section 110 may apply the one or more TCI states to a plurality of kinds of signals.

Information indicating a plurality of transmission configuration indication (TCI) states may be transmitted to transmit downlink control information indicating one or more TCI states of the plurality of TCI states and not indicating scheduling of any of a physical downlink shared channel and a physical uplink shared channel. The control section 110 may control a reception of hybrid automatic repeat request acknowledgement (HARQ-ACK) information for the downlink control information, and the control section 110 mat apply the one or more TCI states to a plurality of kinds of signals.

(User Terminal)

Figure 17:
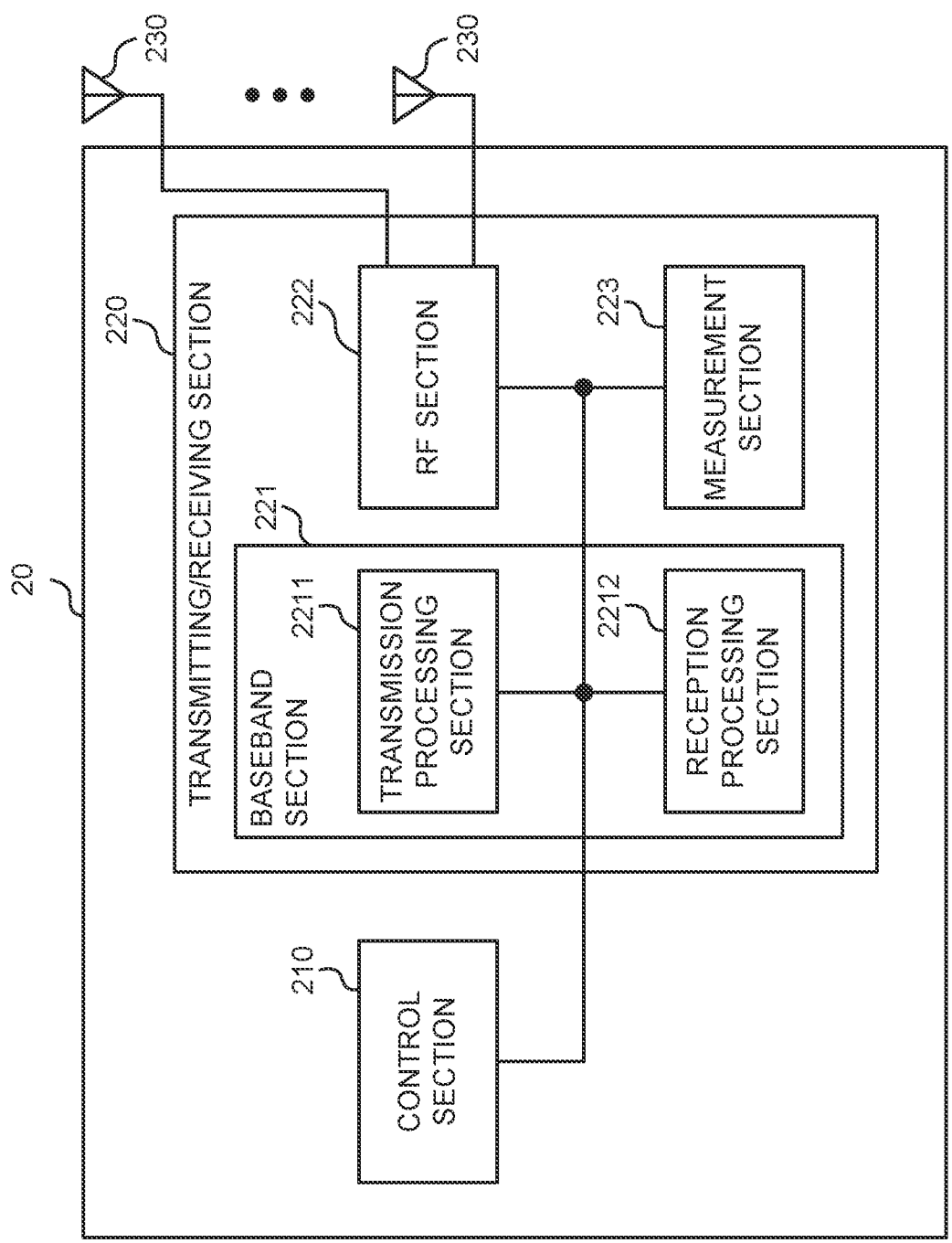
FIG. 17 is a diagram to show an example of a structure of a user terminal according to one embodiment.

FIG. 17 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information indicating a plurality of transmission configuration indication (TCI) states, and receive downlink control information indicating one or more TCI states of the plurality of TCI states and scheduling of one of a physical downlink shared channel and a physical uplink shared channel. The control section 210 may apply the one or more TCI states to a plurality of kinds of signals (the first embodiment).

The downlink control information may indicate scheduling of the physical downlink shared channel. The plurality of kinds of signals may include a downlink signal and an uplink signal.

The downlink control information may indicate scheduling of the physical downlink shared channel. Each of the plurality of kinds of signals may be a downlink signal.

The downlink control information may indicate scheduling of the physical uplink shared channel. Each of the plurality of kinds of signals may be an uplink signal.

The transmitting/receiving section 220 may receive information indicating a plurality of transmission configuration indication (TCI) states, and receive downlink control information indicating one or more TCI states of the plurality of TCI states and not indicating scheduling of any of a physical downlink shared channel and a physical uplink shared channel. The control section 210 may apply the one or more TCI states to a plurality of kinds of signals (the second and third embodiments).

The control section 210 may report hybrid automatic repeat request acknowledgement (HARQ-ACK) information for the downlink control information.

A payload size of a format of the downlink control information may be equal to a payload size of a downlink control information format that is different from the former format.

A radio network temporary identifier (RNTI) scrambling cyclic redundancy check (CRC) of the downlink control information may be different from an RNTI scrambling CRC of a downlink control information format that is different from a format of the downlink control information.

The transmitting/receiving section 220 may receive information indicating a plurality of transmission configuration indication (TCI) states, and receive downlink control information including a field of at least one of one or more TCI states of the plurality of TCI states, a serving cell index, an HARQ timing indicator, a downlink assignment index, a time domain resource assignment, and a physical uplink control channel resource indicator. The control section 210 may apply one or more TCI states to a plurality of kinds of signals.

The control section 210 may report hybrid automatic repeat request acknowledgement (HARQ-ACK) information for the downlink control information.

The control section 210, in a case of mapping the HARQ-ACK information and second HARQ-ACK information for a dynamically scheduled physical downlink shared channel to one physical uplink control channel, may determine a bit location of the HARQ-ACK information based on at least one of the HARQ timing indicator, the downlink assignment index, and the time domain resource assignment.

The control section 210 may apply one or more TCI states to the plurality of kinds of signals after a certain number of symbols from the last symbol of the downlink control information.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 18:
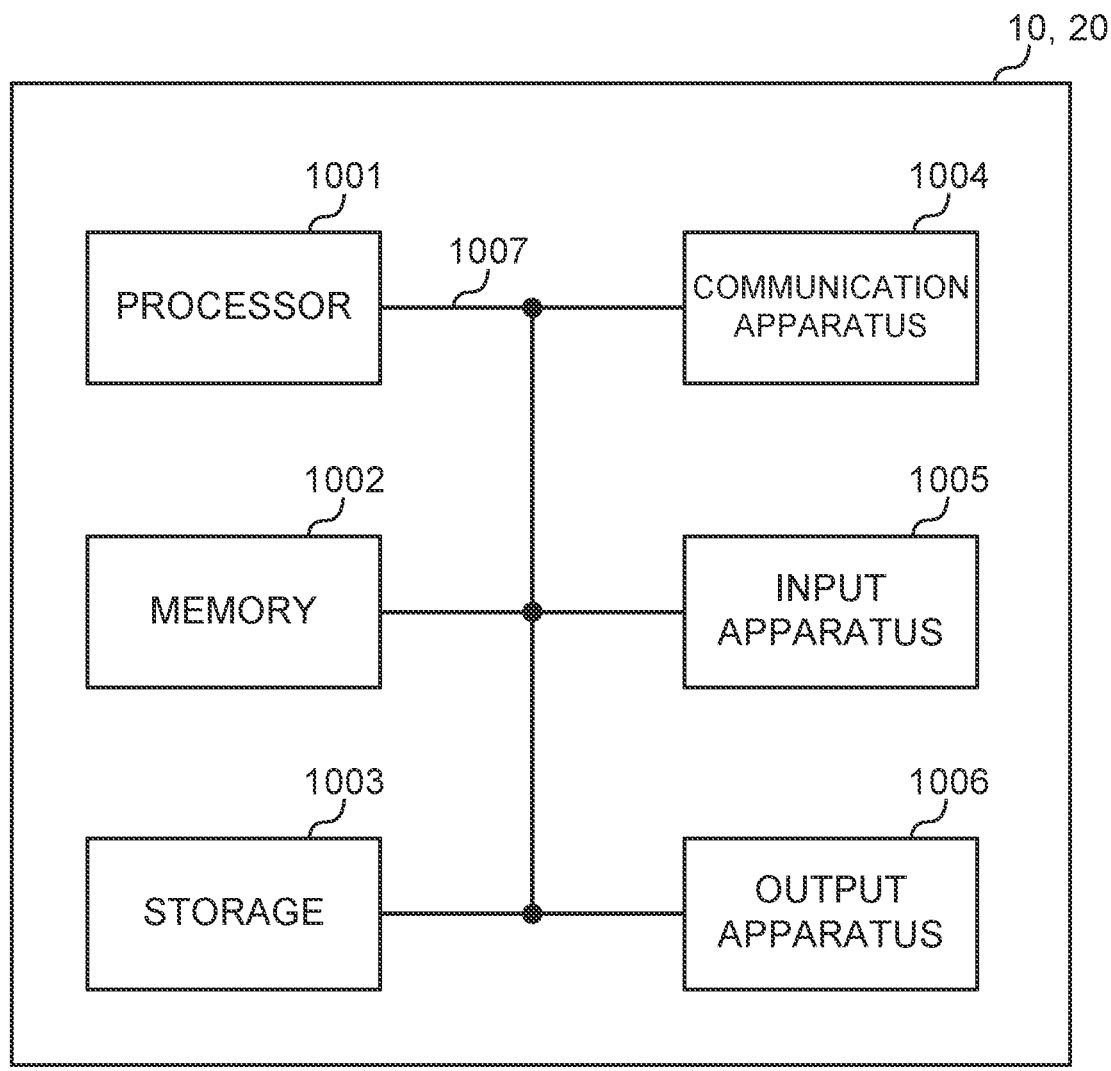
FIG. 18 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 18 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x represents an integer or a decimal, for example)), Future Radio Access (FRA), New-Radio Access Technology (RAT), New Radio (NR), New radio access (NX), Future generation radio access (FX), Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a transmitter that reports UE capability indicating support of indication of one or more transmission configuration indication (TCI) states among multiple TCI states that are applicable to multiple types of uplink (UL) channels and reference signals (RSS) including a physical uplink shared channel (PUSCH), a physical uplink control channel (PUCCH), and a sounding reference signal (SRS);
   a receiver that receives information indicating the multiple TCI states, and receives first downlink control information (DCI) being without data scheduling and indicating the one or more TCI states,
   wherein the transmitter transmits hybrid automatic repeat request acknowledgement (HARQ-ACK) information for the first DCI; and
   a processor that applies, to the multiple types of UL channels and RSs in multiple component carriers (CCs), the one or more TCI states indicated by one or more TCI fields included in the first DCI, and
   wherein a Radio Network Temporary Identifier (RNTI) used for Cyclic Redundancy Check (CRC) scrambling of the first DCI indicating the one or more TCI states is different from a C-RNTI used for CRC scrambling of second DCI that is different from the first DCI.

2. The terminal according to claim 1, wherein the multiple CCs are included in a CC list configured by radio resource control (RRC).

3. The terminal according to claim 1, wherein the first DCI includes a PUCCH resource indicator (PRI) field indicating a PUCCH resource for transmission of the HARQ-ACK information.

4. A radio communication method for a terminal, comprising:
- reporting UE capability indicating support of indication of one or more transmission configuration indication (TCI) states among multiple TCI states that are applicable to multiple types of uplink (UL) channels and reference signals (RSs) including a physical uplink shared channel (PUSCH), a physical uplink control channel (PUCCH), and a sounding reference signal (SRS);
- receiving information indicating the multiple TCI states, and receiving first downlink control information (DCI) being without data scheduling and indicating the one or more TCI states;
- transmitting hybrid automatic repeat request acknowledgement (HARQ-ACK) information for the first DCI; and
- applying, to the multiple types of UL channels and RSs in multiple component carriers (CCs), the one or more TCI states indicated by one or more TCI fields included in the first DCI, and
- wherein a Radio Network Temporary Identifier (RNTI) used for Cyclic Redundancy Check (CRC) scrambling of the first DCI indicating the one or more TCI states is different from a C-RNTI used for CRC scrambling of second DCI that is different from the first DCI.

5. A base station comprising:
- a receiver that receives UE capability indicating support of indication of one or more transmission configuration indication (TCI) states among multiple TCI states that are applicable to multiple types of uplink (UL) channels and reference signals (RSS) including a physical uplink shared channel (PUSCH), a physical uplink control channel (PUCCH), and a sounding reference signal (SRS);
- a transmitter that transmits information indicating the multiple TCI states, and transmits first downlink control information (DCI) being without data scheduling and indicating the one or more TCI states,
- wherein the receiver receives hybrid automatic repeat request acknowledgement (HARQ-ACK) information for the first DCI; and
- a processor that applies, to the multiple types of UL channels and RSs in multiple component carriers (CCs), the one or more TCI states indicated by one or more TCI fields included in the first DCI, and
- wherein a Radio Network Temporary Identifier (RNTI) used for Cyclic Redundancy Check (CRC) scrambling of the first DCI indicating the one or more TCI states is different from a C-RNTI used for CRC scrambling of second DCI that is different from the first DCI.

6. A system comprising a terminal and a base station, wherein
the terminal comprises:
- a transmitter that reports UE capability indicating support of indication of one or more transmission configuration indication (TCI) states among multiple TCI states that are applicable to multiple types of uplink (UL) channels and reference signals (RSs) including a physical uplink shared channel (PUSCH), a physical uplink control channel (PUCCH), and a sounding reference signal (SRS);
- a receiver that receives information indicating the multiple TCI states, and receives first downlink control information (DCI) being without data scheduling and indicating the one or more TCI states,
- wherein the transmitter transmits hybrid automatic repeat request acknowledgement (HARQ-ACK) information for the first DCI; and
- a processor that applies, to the multiple types of UL channels and RSs in multiple component carriers (CCs), the one or more TCI states indicated by one or more TCI fields included in the first DCI, and the base station comprises:
- a transmitter that transmits the information indicating the multiple TCI states, and transmits the first DCI;
- a receiver that receives the UE capability, and receives the HARQ-ACK information; and
- a processor that applies, to the multiple types of UL channels and RSs, the one or more TCI states indicated by the one or more TCI fields, and
- wherein a Radio Network Temporary Identifier (RNTI) used for Cyclic Redundancy Check (CRC) scrambling of the first DCI indicating the one or more TCI states is different from a C-RNTI used for CRC scrambling of second DCI that is different from the first DCI.

* * * * *